United States Patent
Etou et al.

(10) Patent No.: US 11,950,007 B2
(45) Date of Patent: Apr. 2, 2024

(54) SOLID-STATE IMAGING DEVICE AND ELECTRONIC APPARATUS

(71) Applicant: Sony Semiconductor Solutions Corporation, Kanagawa (JP)

(72) Inventors: Shinichirou Etou, Kanagawa (JP); Yusuke Ikeda, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 114 days.

(21) Appl. No.: 17/783,903

(22) PCT Filed: Nov. 18, 2020

(86) PCT No.: PCT/JP2020/043005
§ 371 (c)(1),
(2) Date: Jun. 9, 2022

(87) PCT Pub. No.: WO2021/124774
PCT Pub. Date: Jun. 21, 2021

(65) Prior Publication Data
US 2023/0011014 A1 Jan. 12, 2023

(30) Foreign Application Priority Data
Dec. 19, 2019 (JP) ................. 2019-229664

(51) Int. Cl.
*H04N 25/709* (2023.01)
*H04N 25/75* (2023.01)
*H04N 25/772* (2023.01)

(52) U.S. Cl.
CPC ........... *H04N 25/709* (2023.01); *H04N 25/75* (2023.01); *H04N 25/772* (2023.01)

(58) Field of Classification Search
None
See application file for complete search history.

(56) References Cited

U.S. PATENT DOCUMENTS

2015/0237276 A1* 8/2015 Hynecek ........... H01L 27/14607
257/446

FOREIGN PATENT DOCUMENTS

CA          2325232 C  *  3/2009  ........... H04N 3/1512
DE  202017105479 U1 * 11/2017  ............. H04N 5/335
(Continued)

OTHER PUBLICATIONS

English translation of JP-7214622-B2, Abe, Jan. 2023 (Year: 2023).*
(Continued)

*Primary Examiner* — James M Hannett
(74) *Attorney, Agent, or Firm* — Michael Best & Friedrich LLP

(57) ABSTRACT

Solid-state imaging devices are disclosed. In one example, a solid-state imaging device includes a conversion circuit connected to a vertical signal line of a pixel array, a voltage generation circuit that outputs a predetermined voltage, and a reference voltage generation circuit that receives the predetermined voltage and outputs a reference voltage. The reference voltage generation circuit includes an operational amplifier that amplifies the predetermined voltage and outputs the reference voltage, a capacitive element having one end connected to an input of the operational amplifier that is different from an input that receives the predetermined voltage, a first switching circuit that connects the other end of the capacitive element to either the predetermined voltage output from the voltage generation circuit or a feedback loop of the operational amplifier, and a second switching circuit that selectively connects the one end of the capacitive element to the feedback loop of the operational amplifier.

9 Claims, 21 Drawing Sheets

(56) References Cited

FOREIGN PATENT DOCUMENTS

| JP | 2011-120091 A | 6/2011 | | |
|---|---|---|---|---|
| JP | 2014-230012 A | 12/2014 | | |
| JP | 2019-092143 A | 6/2019 | | |
| JP | 7214622 B2 * | 1/2023 | ............ | H03M 1/145 |

OTHER PUBLICATIONS

English translation of DE-202017105479-U1, Suzuki, Nov. 2017 (Year: 2017).*
International Search Report (PCT/ISA/210), International Application No. PCT/JP2020/043896, dated Feb. 16, 2021.

* cited by examiner

SOLID-STATE IMAGING DEVICE AND ELECTRONIC APPARATUS

FIELD

The Present disclosure relates to a solid-state imaging device and an electronic apparatus.

BACKGROUND

In recent years, complementary metal-oxide semiconductor (CMOS) type solid-state imaging devices (Hereinafter, also referred to as a CMOS image sensor or a CMOS type solid-state imaging device.) have attracted attention as image sensors replacing charge coupled device (CCD) type solid-state imaging devices.

Analog-digital converters (Analog to Digital Converter: hereinafter referred to as ADC) for CMOS type solid-state imaging devices include a pipeline type and a column type. In addition, a column type ADC (Hereinafter, referred to as a column ADC.) includes a single slope integration type using a ramp reference signal, and a successive approximation (Successive Approximation Register: hereinafter referred to as SAR) type switching a reference voltage for each bit. The SAR type column ADC has an advantage that an AD conversion period can be dramatically shortened as compared with the single slope integration type column ADC.

CITATION LIST

Patent Literature

Patent Literature 1: JP 2019-92143 A

SUMMARY

Technical Problem

In the SAR type column ADC in which the reference voltage is switched for each bit, when a voltage difference occurs between a plurality of the reference voltages, linearity of an output signal in a DAC included in the column ADC is affected. That is, when an offset occurs in the reference voltage, the linearity of an output in the DAC included in the column ADC may not be maintained.

Therefore, the present disclosure provides a solid-state imaging device and an electronic apparatus capable of suppressing an offset of a reference signal input to an SAR-type column ADC.

Solution to Problem

According to the present disclosure, a solid-state imaging device is provided. The solid-state imaging device includes a conversion circuit, a voltage generation circuit, and a reference voltage generation circuit. The conversion circuit connects to a vertical signal line extending from a pixel array unit. The voltage generation circuit outputs a predetermined voltage. The reference voltage generation circuit receives the predetermined voltage as an input and outputs a reference voltage of the conversion circuit. The reference voltage generation circuit includes an operational amplifier, a capacitive element, a first switching circuit, and a second switching circuit. The operational amplifier amplifies the predetermined voltage at a predetermined magnification and outputs the reference voltage. The capacitive element has one end connected to an input end of the operational the input end being different from an input end to which the predetermined voltage is input. The first switching circuit switches a connection destination of the other end of the capacitive element to either an output end of the voltage generation circuit from which the predetermined voltage is output or a feedback loop of the operational amplifier. The second switching circuit switches whether or not the one end of the capacitive element is connected to the feedback loop of the operational amplifier.

DESCRIPTION OF EMBODIMENTS

Figure 1:
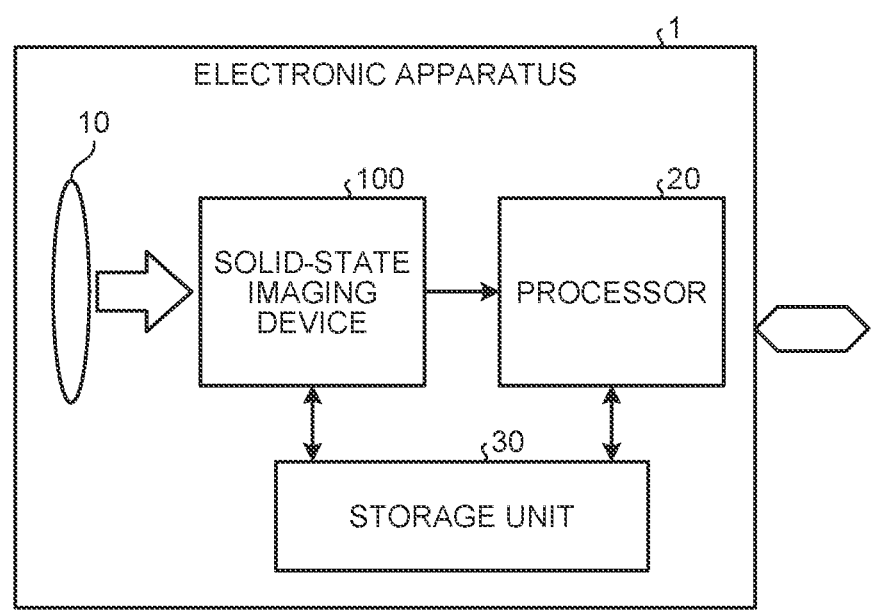
FIG. 1 is a block diagram illustrating a schematic configuration example of an electronic apparatus equipped with a solid-state imaging device according to a technique of the present disclosure.

Hereinafter, preferred embodiments of the present disclosure will be described in detail with reference to the accompanying drawings. Note that, in the present specification and the drawings, components having substantially the same functional configuration are denoted by the same reference signs, and redundant description is omitted.

Note that the description will be given in the following order.

1. Configuration common to each embodiment
1.1. Configuration example of electronic apparatus
1.2. Configuration example of solid-state imaging device
1.3. Configuration example of column ADC
1.4. Configuration example of DAC
2. First embodiment
3. Second embodiment
4. Third embodiment
5. Fourth embodiment
6. Fifth embodiment
7. Sixth embodiment
8. Seventh embodiment
9. Eighth embodiment
10. Ninth embodiment
11. Application example
11.1. System configuration example
11.2. Circuit configuration example of pixel
12. Supplement 1. Configuration Common to Each Embodiment First, a solid-state imaging device and an electronic apparatus will be described as configurations common to each embodiment of the present disclosure with reference to the drawings.

1.1. Configuration Example of Electronic Apparatus

FIG. 1 is a block diagram illustrating a schematic configuration example of an electronic apparatus equipped with a solid-state imaging device according to a technique of the present disclosure. As illustrated in FIG. 1, an electronic apparatus 1 includes, for example, an imaging lens 10, a solid-state imaging device 100, a storage unit 30, and a processor 20.

The imaging lens 10 is an example of an optical system that condenses incident light and forms an image thereof on a light receiving surface of the solid-state imaging device 100. The light receiving surface may be a surface on which photoelectric conversion elements are arranged in the solid-state imaging device 100. The solid-state imaging device 100 photoelectrically converts incident light to generate image data. Furthermore, the solid-state imaging device 100 executes predetermined signal processing such as noise removal and white balance adjustment on the generated image data.

The storage unit 30 includes, for example, a flash memory, a dynamic random access memory (DRAM), a static random access memory (SRAM), or the like, and records image data or the like input from the solid-state imaging device 100.

The processor 20 is configured using, for example, a central procession unit (CPU) or the like, and may include an application processor that executes an operating system, various application software, or the like, a graphics processing unit (CPU), a baseband processor, or the like. The processor 20 executes various processes as necessary on the mage data input from the solid-state imaging device 100, the image data read from the storage unit 30, and the like, executes display to a user, and transmits the image data to the outside via a predetermined network.

1.2. Configuration Example of Solid-State Imaging Device

Figure 2:
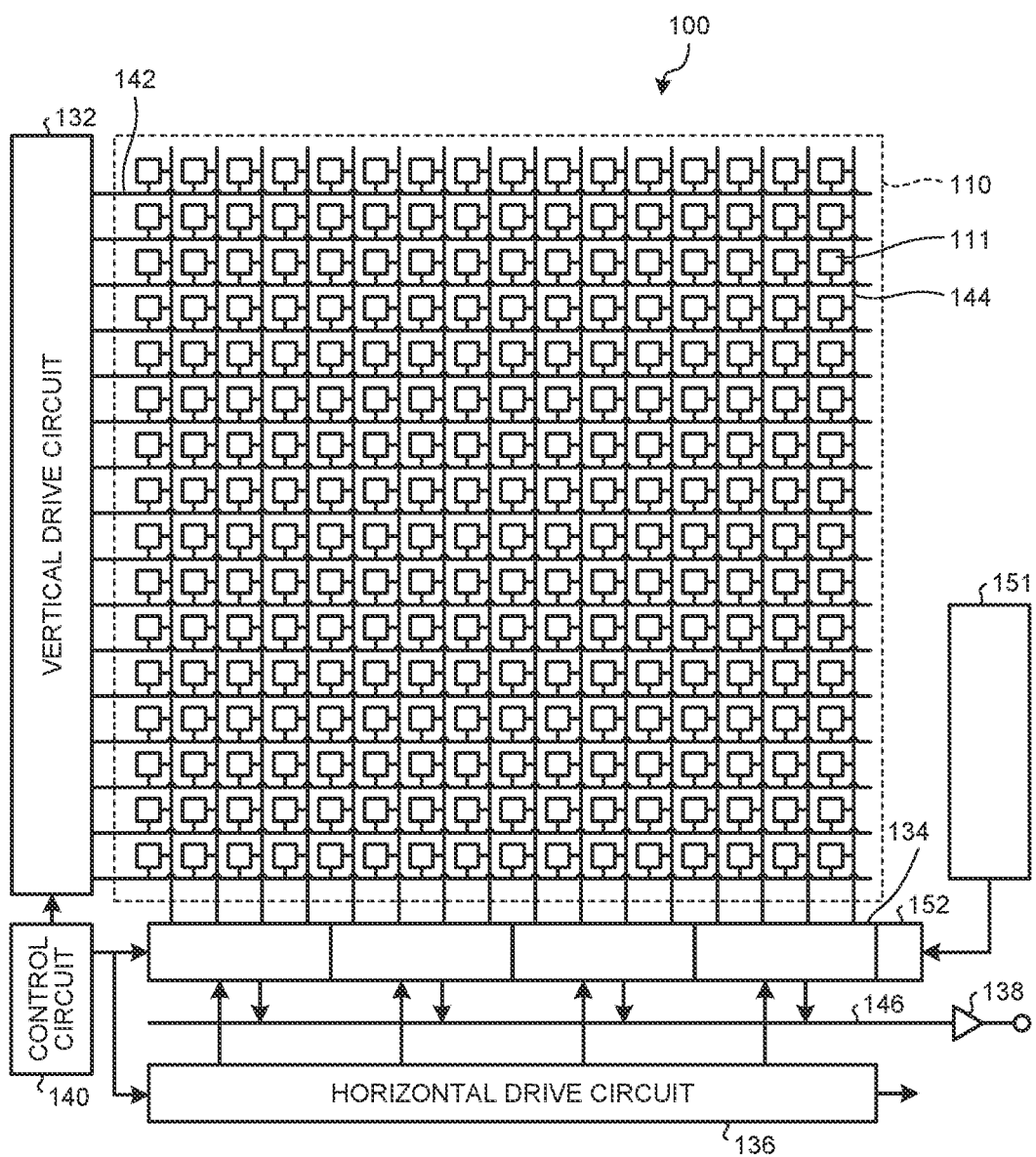
FIG. 2 is an explanatory diagram illustrating a configuration example of a solid-state imaging device common to each embodiment of the present disclosure

FIG. 2 is an explanatory diagram illustrating a configuration example of the solid-state imaging device 100 common to each embodiment of the present disclosure. As illustrated in FIG. 2, the solid-state imaging device 100 includes a pixel array unit 110 in which a plurality of imaging elements 111 are arranged, and a peripheral circuit provided so as to surround the pixel array unit 110. The peripheral circuit includes a vertical drive circuit 132, a column signal processing circuit 134, a horizontal drive circuit 136, an output circuit 138, a control circuit 140, a voltage generation circuit 151, a reference voltage generation circuit 152, and the like. Hereinafter, details of the pixel array unit 110 and the peripheral circuit will be described.

The pie array unit 110 includes a plurality of imaging elements (pixels) 111 two-dimensionally arranged in a matrix on a semiconductor substrate. Furthermore, the plurality of pixels 111 may include a normal pixel that generates a pixel signal for image generation, and a pair of phase difference detection pixels that generates a pixel signal for focus detection. Each of the pixels 111 includes a plurality of photoelectric conversion elements, and a plurality of pixel transistors (not illustrated). More specifically, the pixel transistor may include, for example, a transfer transistor, a selection transistor, a reset transistor, an amplification transistor, and the like.

The vertical drive circuit 132 is formed by, for example, a shift register, selects a pixel drive wiring 142, supplies a pulse for driving the pixels 111 to the selected pixel drive wiring 142, and drives the pixels 111 in units of rows. That is, the vertical drive circuit 132 selectively scans each pixel 111 of the pixel array unit 110 sequentially in the vertical direction (vertical direction in FIG. 2) in units of rows, and supplies a pixel signal based on a charge generated according to an amount of light received by the photoelectric conversion element of each pixel 111 to the column signal processing circuit 134 described later through a vertical signal line 144.

The column signal processing circuit 134 is arranged for each column of the pixels 111, and performs signal processing such as noise removal for each pixel column on the pixel signals output from the pixels 111 of one row. For example, the column signal processing circuit 134 performs signal processing such as correlated double sampling (CDS) and analog-digital (AD) conversion in order to remove pixel-specific fixed pattern noise. The column signal processing circuit 134 includes, for example, an SAR type column ADC.

The horizontal drive circuit 136 is formed of, for example, a shift register, sequentially selects each of the column signal processing circuits 134 described above by sequentially outputting horizontal scanning pulses, and causes each of the column signal processing circuits 134 to output a pixel signal to a horizontal signal line 146.

The output circuit 138 performs signal processing on the pixel signals sequentially supplied from each of the column signal processing circuits 134 described above through the horizontal signal line 146, and outputs the pixel signals. The output circuit 138 may function as, for example, a functional unit that performs buffering, or may perform processing such as black level adjustment, column variation correction, and various digital signal processing. Note that the buffering refers to temporarily storing pixel signals in order to compensate for differences in processing speed and transfer speed when the pixel signals are exchanged.

The voltage generation circuit 151 generates a voltage for generating a reference voltage to be used at the time of AD conversion of the column signal processing circuit 134. The voltage generation circuit 151 may output a voltage of a predetermined voltage value or may output voltages of a plurality of different voltage values.

The reference voltage generation circuit 152 amplifies the voltage output from the voltage generation circuit 151 at a magnification of, for example, 1 or more to generate a reference voltage. When the voltage generation circuit 151 outputs the voltage having a predetermined voltage value, the reference voltage generation circuit 152 generates a reference voltage obtained by amplifying the voltage at a plurality of different magnifications. When the voltage generation circuit 151 outputs voltages of a plurality of different voltage values, the reference voltage generation circuit 152 amplifies the voltages at a predetermined magnification to generate a reference voltage. As described above, the reference voltage generation circuit 152 according to each embodiment of the present disclosure outputs reference voltages having a plurality of different voltage values.

The control circuit 140 can receive an input clock, and data giving an instruction on an operation mode and the like, and can output data such as internal information of the pixels 111. That is, the control circuit 140 generates a clock signal or a control signal serving as a reference of operations of the vertical drive circuit 132, the column signal processing circuit 134, the horizontal drive circuit 136, the voltage generation circuit 151, the reference voltage generation circuit 152, and the like on the basis of a vertical synchronization signal, a horizontal synchronization signal, and a master clock. Then, the control circuit 140 outputs the generated clock signal and control signal to the vertical drive circuit 132, the column signal processing circuit 134, the horizontal drive circuit 136, the voltage generation circuit 151, the reference voltage generation circuit 152, and the like.

Note that the configuration example of the solid-state imaging device 100 according to the present embodiment is not limited to the example illustrated in FIG. 2, and may include, for example, other circuit units and the like, and is not particularly limited.

1.3. Configuration Example of Column ADC

Figure 3:
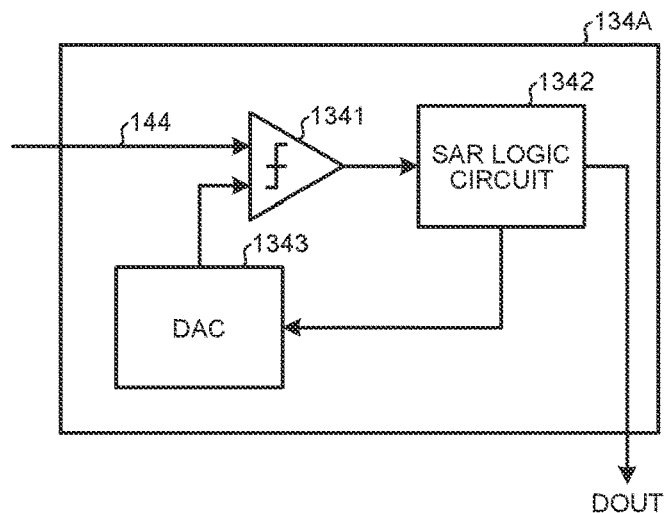
FIG. 3 is a diagram illustrating a configuration example of an AD converter of a column signal processing circuit common to each embodiment of the present disclosure.

FIG. 3 is a diagram illustrating a configuration example of an AD converter 134A of the column signal processing circuit 134 common to each embodiment of the present disclosure. The column signal processing circuit 134 includes, for example, an AD converter 134A illustrated in FIG. 3 for each vertical signal line. Note that hereinafter, the AD converter 134A included in the column signal processing circuit 134 is also referred to as a column ADC 134A.

The column ADC 134A illustrated in FIG. 3 includes a comparator 1341, a successive approximation register (SAR) logic circuit 1342, and a digital to analog converter (DAC) 1343.

The comparator 1341 compares a pixel signal input via the vertical signal line 144 with a predetermined reference signal. The comparator 1341 outputs a comparison result to the SAR logic circuit 1342.

Based on the comparison result of the comparator 1341, the SAR logic circuit 1342 obtains a digital signal indicating a value of a reference signal that approximates the pixel signal, holds the digital signal in a register, and generates a control signal for updating the reference signal to that value.

The DAC 1343 updates the analog reference signal by digital-to-analog (DA) conversion for the control signal.

In an initial state, a level of the reference signal is set to, for example, an initial value VREF/2 with a predetermined reference signal as VREF. Then, the comparator 1341 compares a selected pixel signal with the reference signal of the initial value. When the pixel signal is larger than the reference signal, the SAR logic circuit 1342 sets the most significant bit (MSB) of the digital signal DOUT to "1". The SAR logic circuit 1342 then raises the reference signal by VREF/4.

On the other hand, when the pixel signal is equal to or less than the reference signal, the SAR logic circuit 1342 sets the MSB of the digital signal DOUT to "0". The SAR logic circuit 1342 then decreases the reference signal by VPEF/4.

Then, the comparator 1341 performs the following comparison, and when the pixel signal is larger than the reference signal, the SAR logic circuit 1342 sets the next digit of the MSB to "1". The SAR logic circuit 1342 then raises the reference signal by VREF/8.

On the other hand, when the pixel signal is less than or equal to the reference signal, the SAR logic circuit 1342 sets the next digit of the MSB to "0". The SAP logic circuit 1342 then decreases the reference signal by VREF/8.

Hereinafter, a similar procedure is continued until the least significant bit (LOB). As a result, the analog pixel signal is AD-converted into the digital signal DOUT. At the end of the AD conversion, the SAR logic circuit 1342 outputs the digital signal DOUT. The digital signal DOUT indicates data (that is, pixel data) obtained by performing AD conversion on a pixel signal (reset level or signal level).

Note that a gain of the column ADC 134A can be controlled by changing the reference voltage VREF.

1.4. Configuration Example of DAC

Figure 4:
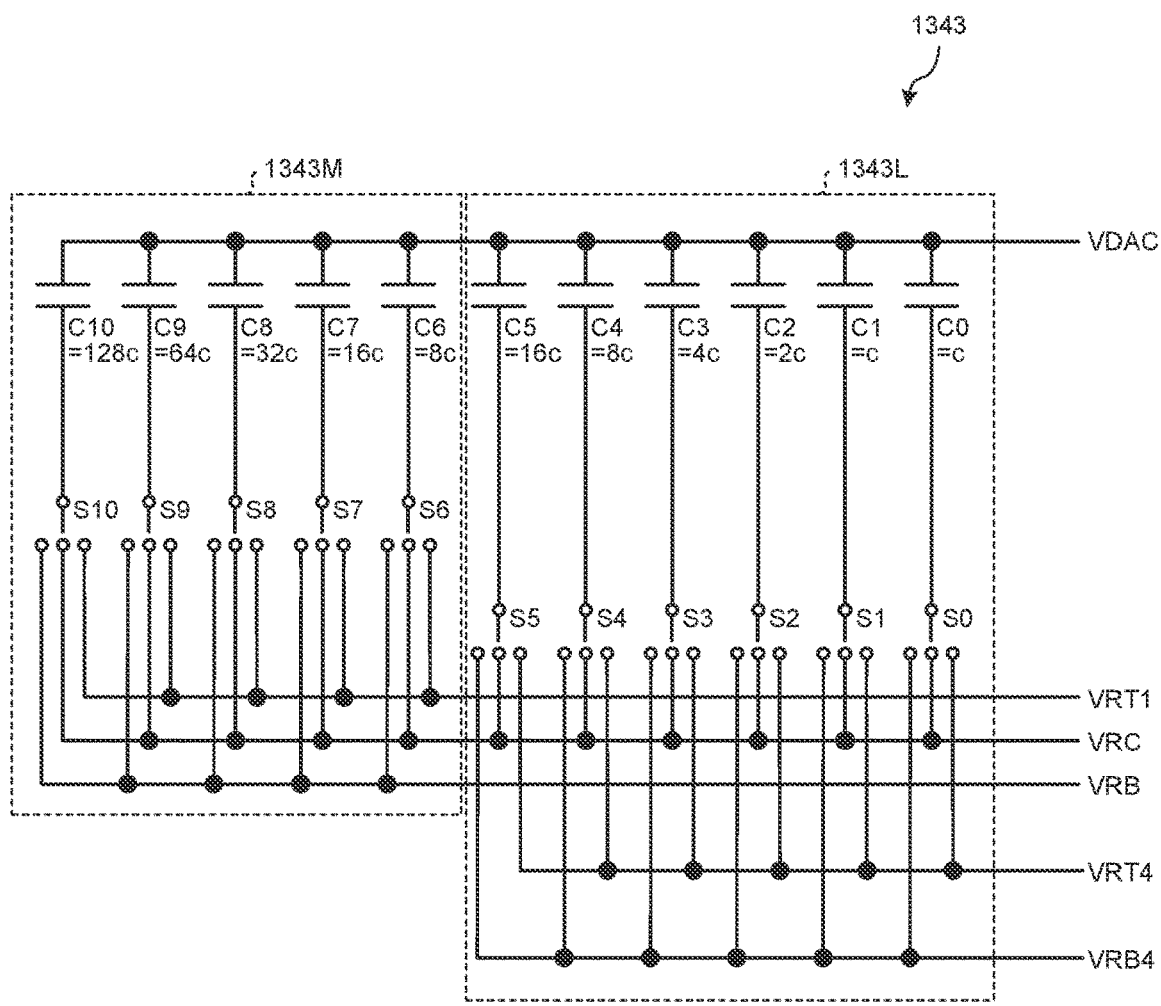
FIG. 4 is a diagram illustrating a configuration example of a DAC common to each embodiment of the present disclosure.

FIG. 4 is a diagram illustrating a configuration example of the DAC 1343 common to each embodiment of the present disclosure. The DAC 1343 illustrated in FIG. 4 includes an upper bit DAC 1343M that generates a reference signal for upper bits, and a lower bit DAC 1343L that generates a reference signal for lower bits. The DAC1343 includes a plurality of capacitive elements C0 to C10, and a plurality of switches S0 to S10 arranged corresponding to the plurality of capacitive elements C0 to C10. In FIG. 4, a capacitance C of each of the capacitive elements C0 to C10 is indicated by a ratio. The plurality of switches S0 to S10 are connected so as to be able to switch any one of reference voltages VRT1, VRT4, VRB, VRB4, and VRC output from the reference voltage generation circuit 152 described later, for example.

That is, the DAC 1343 is a binary CDAC that supplies a reference signal VDAC having different values to the comparator 1341 according to the combination of the capacitance values of the capacitive elements C0 to C10 and the value of the reference voltage.

As described above, by outputting the reference signal VDAC having different values according to the combination of the values of the capacitances of the capacitive elements C0 to C10 and the value of the reference voltage, a total capacitance value of the DAC 1343, that is, an area of the DAC 1343 can be reduced.

The total capacitance value of the capacitive elements C0 to C10 of the DAC 1343 illustrated in FIG. 4 is 280 C. On the other hand, when the DAC 1343 is configured such that the reference voltage input to the DAC 1343 is only one set of the reference voltages VRT4 and VRB4, for example, the capacitance values of the capacitive elements C0 to C10 need to be increased in a Binary relationship, and thus the total capacitance value becomes 1024C. Since the area of the capacitive elements C0 to C10 increases according to the capacitance value, if the total capacitance value of the capacitive elements C0 to C10 is large, the area of the DAC 1343 also increases.

As described above, by inputting a plurality of reference voltages to the DAC 1343, the reference signal VDAC that changes in a Binary relationship can be output. Therefore, the total capacitance value of the capacitive elements C0 to C10 can be reduced as compared with the case where the reference voltage is one set. As a result, the area of the DAC 1343 can be reduced.

Here, a case where the reference voltage includes an offset voltage will be described. As will be described later, since the reference voltage generation circuit 152 includes an operational amplifier, the reference voltage includes an offset voltage caused by the operational amplifier.

Since the offset voltage affects the linearity of the reference signal VD AC output from the DAC 1343, the offset voltage also affects the linearity of the output signal of the column ADC.

First, the reference signal VDAC in a case where the offset voltage is not included in the reference voltage will be described. Here, it is assumed that the relationship of the reference voltages illustrated in FIG. 4 is VRT1−VRB=VREF and VRT4−VRB4=VREF/4. In addition, here, it is assumed that the offset voltages are not included in the reference voltages VRT1 and VRT4.

It is assumed that the plurality of switches S0 so S10 select the reference voltage VRC as a voltage to be applied to the capacitive elements C0 to C10. Note that the reference voltage VRC is an intermediate value (VRC=VRT1−VREF/2) between VRT1 and VRB. At this time, it is assumed that a connection destination of the switch S10 is switched such that a voltage applied to the capacitor C10 corresponding to the most significant bit (MSB) changes from the reference voltage VRC to the reference voltage VRT1. A change amount of the reference signal VDAC of the DAC 1343 changed by the switching of the switch S10 is 128 C/280 C×VREF/2=64VREF/280. This is a voltage change amount of 512LSB. Note that 280 C is a total capacity value of the DAC 1343.

Furthermore, when a connection destination of the switch S6 corresponding to the capacitive element C6 is switched from the reference voltage VRC to the reference voltage VRT1, a change amount of the reference signal VDAC of the DAC 1343 is 8 C/280 C×VREF/2=4VREF/280. This is a voltage change amount of 32LSB.

Further, in a case where a connection destination of the switch S5 corresponding to the capacitive element C5 is switched from the reference voltage VPC to the reference voltage VRT4, a change amount of the reference signal VDAC of the DAC 1343 is 16 C/280 C×VREF/8=2VREF/280. This is a voltage change amount of 16LSB.

As described above, even if the relationship between the capacitance values of the capacitive elements C0 to C10 is not a Binary relationship, the reference signal VDAC, which is the output of the DAC 1343, can be changed to satisfy the Binary relationship by using a plurality of reference voltages.

Figure 5:
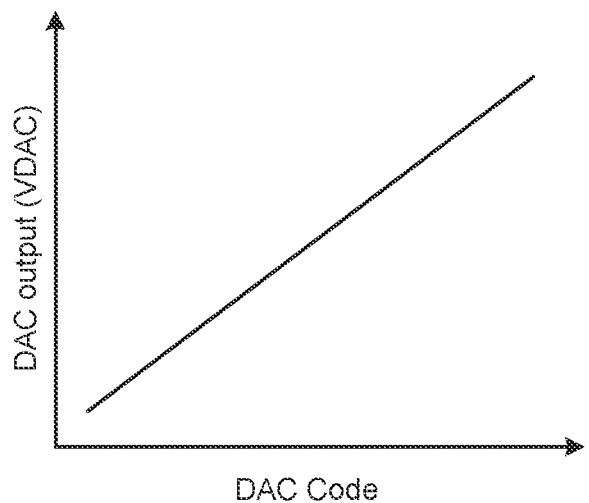
FIG. 5 is a diagram for explaining a relationship between a DACcode and a reference signal VDAC in a case where an offset voltage is not included in a reference voltage.

As described above, in a case where the offset voltage is not included in the reference voltage, a relationship between a DACcode and the reference signal VDAC is a linearity relationship as illustrated in FIG. 5. Note that FIG. 5 is a diagram for explaining the relationship between the DACcode and the reference signal VDAC in a case where the offset voltage is not included in the reference voltage. In addition, the voltage value of the reference signal VDAC output from the DAC 1343 is a discrete value, but in FIG. 5, the change of the reference signal VDAC is continuously illustrated in order to make the linearity relationship easy to see.

Although details will be described later, in a case where the reference voltage generation circuit 152 includes an operational amplifier for each reference voltage to be generated, for example, a different offset voltage is generated for each reference voltage. Therefore, a voltage difference $\Delta V$ corresponding to the offset voltage is generated between the plurality of reference voltages. Hereinafter, in order to simplify the description, it is assumed that an offset voltage is not included in the reference voltage VRT1, but an offset voltage of $\Delta V$ is generated in the reference voltage VRT4.

A case where a connection destination of the switch S5 corresponding to the capacitive element C5 is switched from the reference voltage VRE to the reference voltage VRT4 be described. Since the offset voltage of $\Delta V$ is generated in the reference voltage VRT4, a change amount of the reference signal VDAC of the DAC 1343 is 16 C/280 C×(VREF/8+$\Delta V$/2)=2VREF/280+8$\Delta V$/280. This is a voltage change amount of 16LSB+$\Delta$LSB.

Here, since 16LSB=2VREF/280, $\Delta$LSB is $\Delta$LSB=8$\Delta V$/280+2VREF/280=4$\Delta V$×2/280=4$\Delta V$×16LSB/VREF. When this equation is rearranged, $\Delta$LSB=$\Delta V$/(VREF/4)×32LSB×½.

Figure 6:
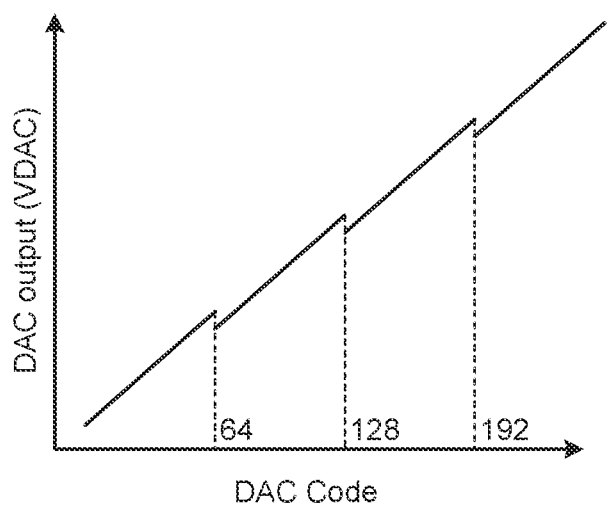
FIG. 6 is a diagram for explaining a relationship between a DACcode and a reference signal VDAC in a case where an offset voltage is included in a reference voltage.

In a case where ΔV is smaller than zero, that is, the offset voltage is a negative value, as illustrated in FIG. 6, the reference signal VDAC becomes small in the DACcode in which the reference voltage is switched, and the linearity relationship is not satisfied. Note that FIG. 6 is a diagram for explaining the relationship between the DACcode and the reference signal VDAC in a case where the offset voltage is included in the reference voltage. In addition, the voltage value of the reference signal VDAC output from the DAC 1343 is a discrete value, but in FIG. 6, the change of the reference signal VDAC is continuously illustrated in order to make the linearity relationship easy to see.

Figure 7:
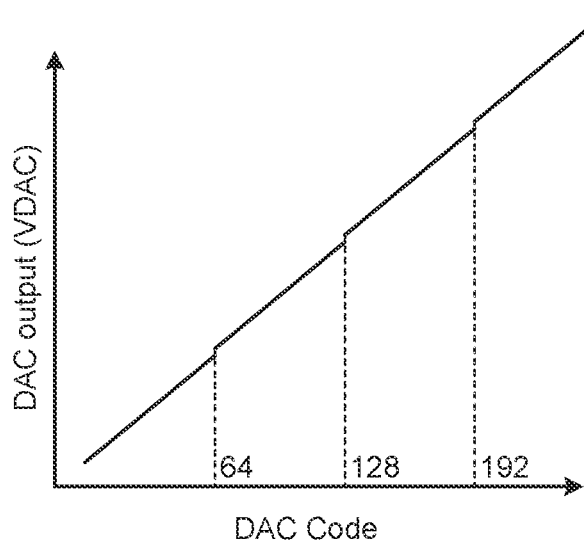
FIG. 7 is a diagram for explaining a relationship between a DACcode and a reference signal VDAC in a case where an offset voltage is included in a reference voltage.

On the other hand, in a case where ΔV is larger than zero, that is, in a case where the offset voltage is a positive value, as illustrated in FIG. 7, the reference signal VDAC becomes large in the DACcode in which the reference voltage is switched, and the linearity relationship is not satisfied. Note that FIG. 7 is a diagram for explaining the relationship between the DACcode and the reference signal VDAC in a case where the offset voltage is included in the reference voltage. In addition, the voltage value of the reference, signal VDAC output from the DAC 1343 is a discrete value, but in FIG. 7, the change of the reference signal VDAC is continuously illustrated in order to make the linearity relationship easy to see.

As described above, when the offset voltage is included in the reference voltage output from the reference voltage generation circuit 152, the linearity of the output of the DAC 1343 or the column ADC 134A may not be satisfied. The technique of the present disclosure focuses on this point, and cancels the offset voltage included in the reference voltage to reduce the influence of the offset voltage and satisfy the linearity of the DAC 1343. Hereinafter, in each embodiment, the reference voltage generation circuit 152 that cancels the offset voltage included in the reference voltage will be described.

2. First Embodiment

Next, a reference voltage generation circuit 152A according to a first embodiment of the present disclosure will be described. The reference voltage generation circuit 152A according to the present embodiment causes the capacitive element to hold an input-converted offset voltage generated at an input of the operational and adds the held offset voltage to the input of the operational amplifier with an opposite polarity to execute offset cancellation.

Figure 8:
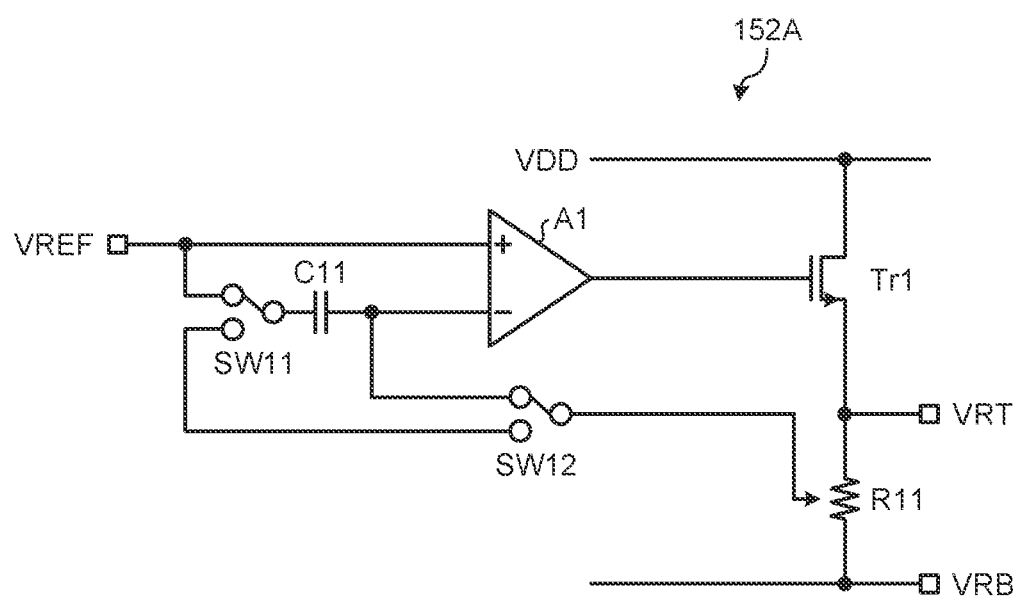
FIG. 8 is a diagram illustrating a configuration example of a reference voltage generation circuit according to a first embodiment of the present disclosure.

FIG. 8 is a diagram illustrating a configuration example of the reference voltage generation circuit 152A according to the first embodiment of the present disclosure. The reference voltage generation circuit 152A includes an operational amplifier A1, a capacitive element C11, first and second switches SW11 and SW12, a transistor Tr1, and a variable resistance circuit R11.

The operational amplifier A1 amplifies the reference voltage VREF generated by the voltage generation circuit 151 at a predetermined magnification, and outputs the amplified reference voltage VREF. Note that an amplification factor of the operational amplifier A1 also includes one. When the amplification factor is one, the operational amplifier A1 functions as a buffer circuit.

The output of the operational amplifier A1 is input to the transistor Tr1. The transistor Tr1 is a source follower circuit, and outputs a reference voltage VRT obtained by amplifying the output of the operational amplifier A1. In this manner, by directly outputting the reference voltage VRT from a source terminal of the transistor Tr1 without passing through a resistor, it is possible to suppress a decrease in responsiveness due to an impedance component of the resistor. As a result, the reference voltage generation circuit 152A can be operated at a higher speed.

One end of the capacitive element C11 is connected to an input end different from an input end to which the reference voltage VREF of the operational amplifier A1 is input, and the other end is connected to the first switch SW1. The variable resistance circuit R11 has one end connected to the transistor Tr1, and the other end connected to a reference potential VRE. A resistance value of a feedback loop of the operational amplifier A1 can be changed by the variable resistance circuit R11. When the resistance value of the feedback loop changes, the amplification factor of the operational amplifier A1 changes. Therefore, a value of the reference voltage VRT can be changed by changing the resistance value of the feedback loop using the variable resistance circuit R11, and the reference voltage generation circuit 152A can generate a plurality of reference voltages.

The first switch SW11 is disposed between the capacitive element C11 and an input end of the reference voltage generation circuit 152A, that is, an output end of the voltage generation circuit 151. The first switch SW11 is a switching circuit that switches a connection destination of the other end of the capacitive element C11 to either the output end of the voltage generation circuit 151 or the feedback loop of the operational amplifier A1. For example, in a High state, the first switch SW11 connects the other end of the capacitive element C11 and the input end of the reference voltage generation circuit 152A, that is, the output end of the voltage generation circuit 151. Furthermore, when the first switch SW11 is in a Low state, for example, the other end of the capacitive element C11 is connected to the feedback loop of the operational amplifier A1.

The second switch SW12 is disposed in the feedback loop of the operational amplifier A1. The second switch SW12 is a switching circuit that switches whether or not one end of the capacitive element C11 is connected to the feedback loop of the operational amplifier A1. Furthermore, the second switch SW12 connects the other end of the capacitive element C11 to the feedback loop of the operational amplifier A1 in conjunction with the first switch SW11. For example, in a High state, the second switch SW12 connects one end of the capacitive element C11 to the feedback loop of the operational amplifier A1. Further, when the second switch SW12 and the first switch SW11 are in a Low state, the other end of the capacitive element C11 is connected to the feedback loop of the operational amplifier A1.

Here, as described above, the reference voltage generation circuit 152A according to the present embodiment adjusts the gain of the operational amplifier A1 by adjusting the resistance value of the variable resistance circuit R11, and outputs a plurality of reference voltages. At this time, an offset voltage is generated in the operational amplifier A1, which affects the linearity of the gain of the operational amplifier A1.

Figure 9:
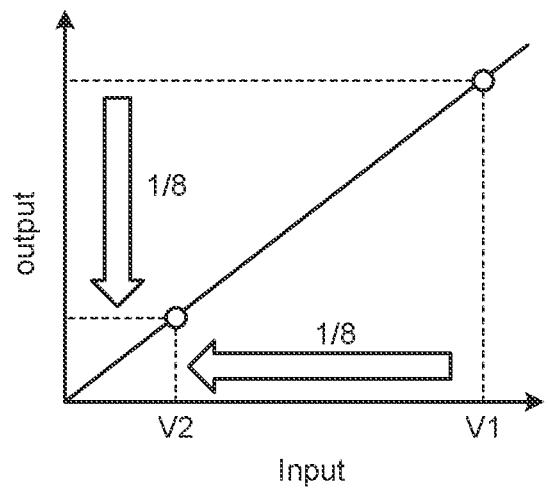
FIG. 9 is a diagram for explaining a gain of an operational amplifier in a case where no offset voltage is generated in the operational amplifier.

As illustrated in FIG. 9, in a case where no offset voltage is generated in the operational amplifier A1, when the reference voltage VREF, which is an input voltage of the operational amplifier A1, is multiplied by ⅛ and changed from V1=VREF to V2=VREF/8, the reference voltage VRT, which is an output voltage of the operational amplifier A1, becomes VRT=VREF/8. As described above, when the offset voltage is not generated in the operational amplifier A1, the linearity of the gain of the operational amplifier A1 is not affected. Note that FIG. 9 is a diagram for explaining the gain of the operational amplifier A1 in a case where no offset voltage is generated in the operational amplifier A1.

On the other hand, a case where an offset voltage is generated in the operational amplifier A1 will be described. For example, it is assumed that when the reference voltage VREF is input to the reference voltage generation circuit 152A, the reference voltage generation circuit 152A outputs the reference voltage VREF. In this case, since the reference voltage includes the offset voltage, the reference voltage VRT actually output by the reference voltage generation circuit 152A becomes VRT=VREF×ΔV.

In such a case, even if the reference voltage VREF that is the input voltage is multiplied by ⅛, the offset voltage ΔV does not become ⅛ times. Therefore, the reference voltage VRT output from the reference voltage generation circuit 152A is VRT=VREF/8+ΔV. As described above, when the offset voltage is included in the reference voltage, even if the reference voltage VREF that is the input voltage is multiplied by ⅛, the reference voltage VRT that is the output voltage does not become ⅛ times.

Figure 10:
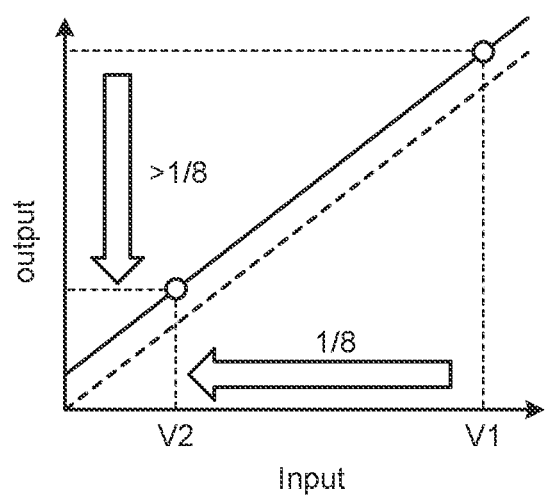
FIG. 10 is a diagram for explaining a gain of an operational amplifier in a case where an offset voltage is generated in the operational amplifier.
Figure 11:
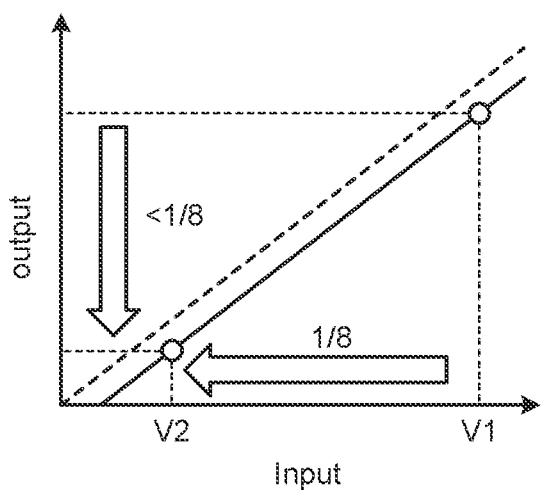
FIG. 11 is a diagram for explaining a gain of an operational amplifier in a case where an offset voltage is generated in the operational amplifier.

As illustrated in FIG. 10, in a case where the offset voltage is larger than 0, that is, in a case where the offset voltage is positive, the reference voltage VRT becomes larger than ⅛ times the reference voltage VREF even if the reference voltage VREF, which is the input voltage, is multiplied by ⅛. Furthermore, as illustrated in FIG. 11, in a case where the offset voltage is smaller than 0, that is, in a case where the offset voltage is negative, even if the reference voltage VREF, which is the input voltage, is multiplied by ⅛, the reference voltage VRT becomes smaller than ⅛ times the reference voltage VREF. Note that FIGS. 10 and 11 are diagrams for explaining the gain of the operational amplifier A1 when the offset voltage is generated in the operational amplifier A1.

Thus, when the offset voltage is generated in the operational amplifier A1, the linearity of the gain of the operational amplifier A1 is affected. Therefore, in the reference voltage generation circuit 152A according to the present embodiment, the offset voltage of the operational amplifier A1 is canceled using the capacitive element C11. As a result, the reference voltage generation circuit 152A according to the present embodiment can reduce the influence of the linearity on the gain of the operational amplifier A1.

Figure 12:
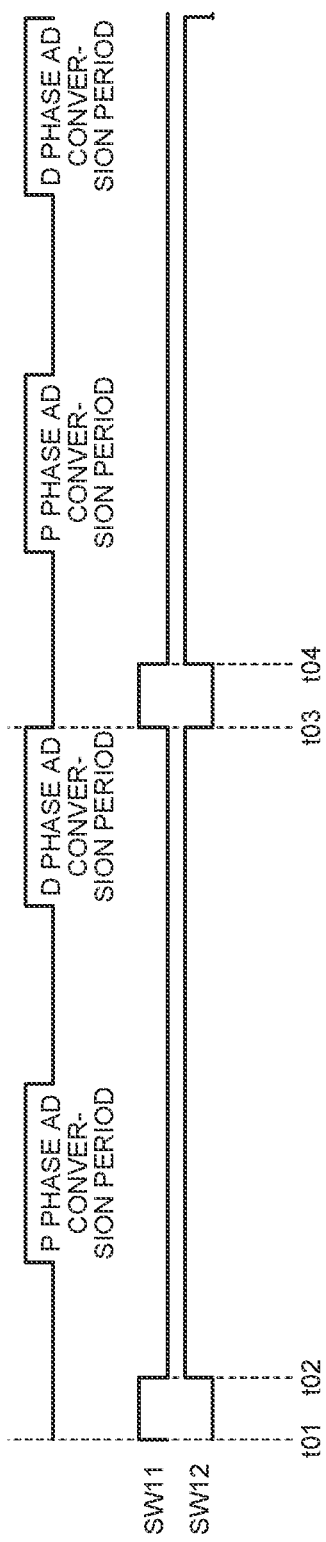
FIG. 12 is a diagram for explaining an operation example of the reference voltage generation circuit according to the first embodiment of the present disclosure.

Next, operations of the first and second switches SW11 and SW12 of the reference voltage generation circuit 152A according to the first embodiment of the present disclosure will be described with reference to FIG. 12. FIG. 12 is a diagram for explaining an operation example of the reference voltage generation circuit 152A according to the first embodiment of the present disclosure.

As illustrated in FIG. 12, at time t01, the first switch SW11 of the reference voltage generation circuit 152A goes into a High state, and the second switch SW12 goes into a Low state. As a result, as illustrated in FIG. 13, one end of the capacitive element C11 is connected to the feedback loop of the operational amplifier A1, and the other end is connected to the output end of the voltage generation circuit 151.

Figure 13:
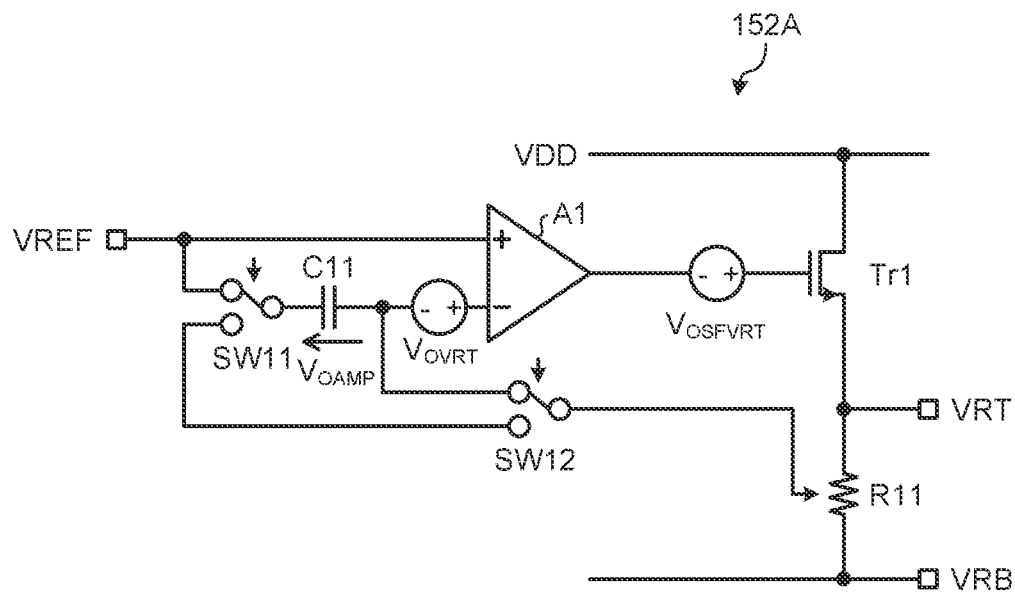
FIG. 13 is a diagram for explaining offset cancellation by the reference voltage generation circuit according to the first embodiment of the present disclosure.

An offset voltage $V_{OAMP}$ corresponding to an input-converted offset voltage $V_{OVRT}$ generated in the operational amplifier A1 and an offset voltage $V_{OSFVRT}$ of the transistor Tr1 is applied to both ends of the capacitive element C11 illustrated in FIG. 13. As a result, charges for canceling the offset voltage $V_{OAMP}$ are accumulated in the capacitive element C11. It can also be said that a period from time t01 to time t02 is an offset sampling period in which the capacitive element C11 samples the offset voltage $V_{OAMP}$.

Note that FIG. 13 is a diagram for explaining offset cancellation by the reference voltage generation circuit 152A accord in to the first embodiment of the present disclosure.

Figure 14:
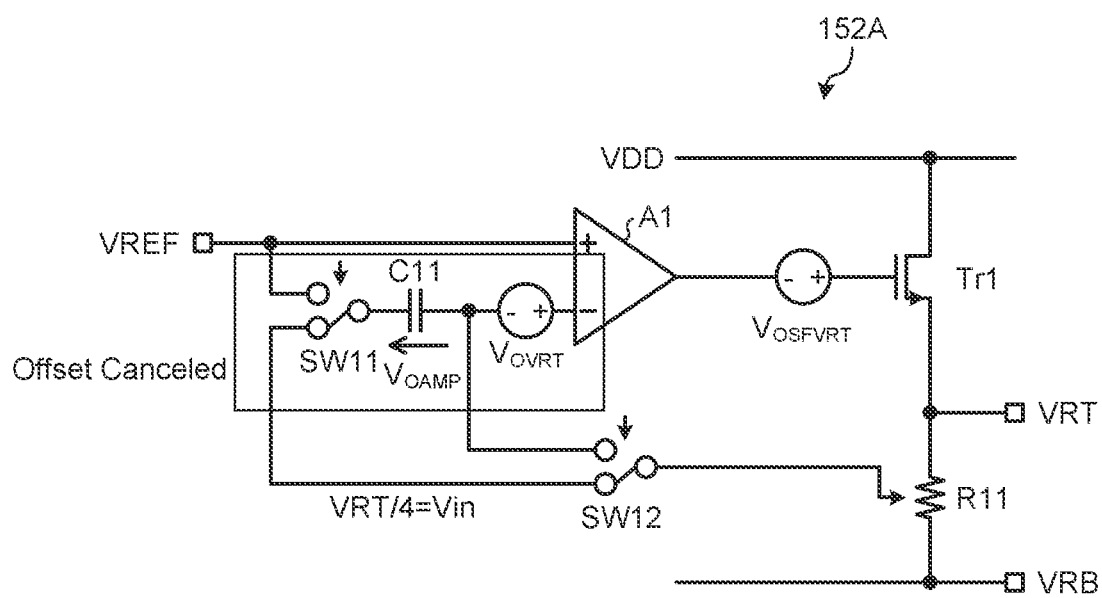
FIG. 14 is a diagram for explaining offset cancellation by the reference voltage generation circuit according to the first embodiment of the present disclosure.

The description returns to FIG. 12. At time t02, the first switch SW11 enters the Low state, and the second switch SW12 enters the High state. As a result, as illustrated in FIG. 14, one end of the capacitive element C11 is connected to the input end of the operational amplifier A1, and the other end is connected to the feedback loop of the operational amplifier A1. As described above, the other end of the capacitive element C11 is connected to the feedback loop of the operational amplifier A1, thereby constituting the feedback loop of the operational amplifier A1.

The capacitive element C11 that has accumulated charges between the time t01 and the time t02 is connected to the feedback loop of the operational amplifier A1 at the time t02 with a polarity opposite to that until then, thereby canceling the offset voltage $V_{OAMP}$ of the feedback loop. As described above, it can also be said that a period from time t02 to time t03 is a period (an offset cancellation period) in which the operational amplifier A1 outputs the reference voltage while executing the offset cancellation by the capacitive element C11. Note that FIG. 14 is a diagram for explaining the offset cancellation by the reference voltage generation circuit 152A according to the first embodiment of the present disclosure.

The description returns to FIG. 12. The reference voltage generation circuit 152A executes offset sampling every time the solid-state imaging device 100 reads out one row of the pixels 111. When the solid-state imaging device 100 reads out one row of the pixels 111 between time t01 and time t03, the reference voltage generation circuit 152A sets the first switch SW11 to the High state and sets the second switch SW12 to the Low state at time t03. As a result, the offset is sampled by the capacitive element C11. Subsequently, at time t04, the reference voltage generation circuit 152A sets the first switch SW11 to the Low state and sets the second switch SW12 to the Low state. As a result, the offset is canceled by the capacitive element C11, and the reference voltage generation circuit 152A outputs a reference voltage that does not include the offset voltage.

In this manner, the reference voltage generation circuit 152A samples and cancels the offset voltage using the capacitive element C11. As a result, it is possible to suppress the offset of the reference voltage input to the DAC 1343 of the column ADC 134A.

3. Second Embodiment

Next, a second embodiment of the present disclosure will be described. A reference voltage generation circuit 152B according to the second embodiment of the present disclosure includes a sample hold circuit that holds the output of the operational amplifier A1 in addition to the configuration of the reference voltage generation circuit 152A illustrated in FIG. 8.

Figure 15:
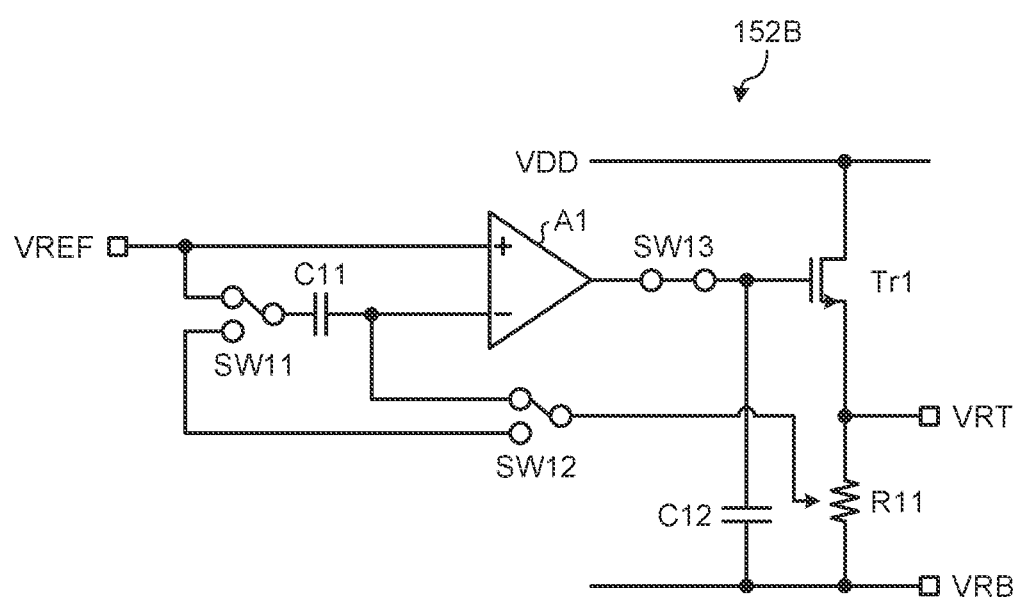
FIG. 15 is a diagram illustrating a configuration example of a reference voltage generation circuit according to a second embodiment of the present disclosure.

FIG. 15 is a diagram illustrating a configuration example of the reference voltage generation circuit 152B according to the second embodiment of the present disclosure. As illustrated in FIG. 15, the reference voltage generation circuit 152B of the present embodiment includes a sample hold circuit.

The sample hold circuit includes a third switch SW13 and a capacitive element C12. One end of the capacitive element C12 is connected between the output end of the operational amplifier and a gate terminal of the transistor Tr1, and the other end is connected to the reference potential VRB. The third switch SW13 is disposed between one end of the capacitive element C12 and the output end of the operational amplifier A1.

When the third switch SW13 is turned on (High), the output of the operational amplifier A1 is sampled by the capacitive element C12. Furthermore, when the third switch SW13 is turned off (Low), the output of the operational amplifier A1 sampled by the capacitive element C12 is output to the transistor Tr1.

Figure 16:
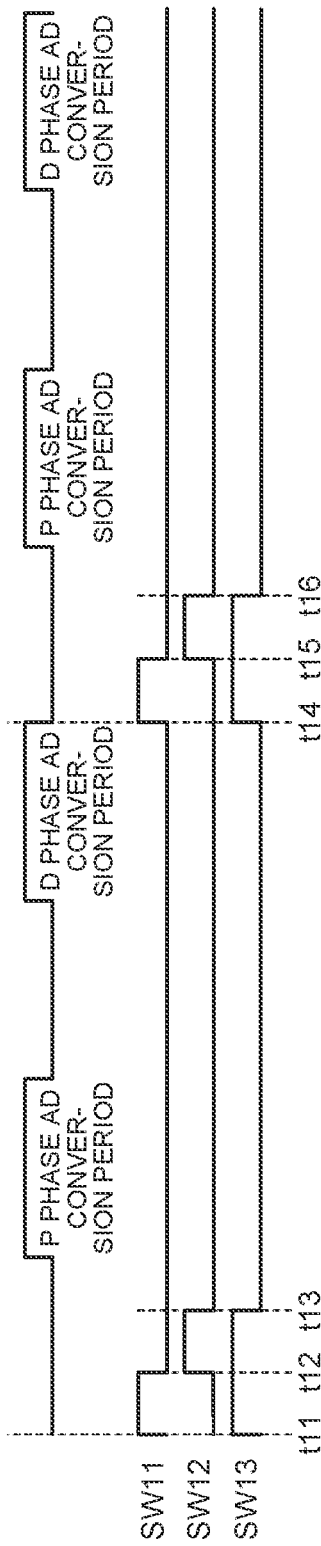
FIG. 16 is a diagram for explaining an operation example of the reference voltage generation circuit according to the second embodiment of the present disclosure.

Next, operations of the first and second switches SW11 and SW12 of the reference voltage generation circuit 152B according to the first embodiment of the present disclosure will be described with reference to FIG. 16. FIG. 16 is a diagram for explaining an operation example of the reference voltage generation circuit 152B according to the second embodiment of the present disclosure.

As illustrated in FIG. 16, at time t11, the first switch SW11 of the reference voltage generation circuit 152B is in the High state, and the second switch SW12 is in the Low state. In addition, the third switch 513 enters the High state. As a result, charges for canceling the offset voltage are accumulated in the capacitive element C11.

At time t12, the first switch SW11 enters the Low state, and the second switch SW12 enters the High state. Note that the third switch SW13 maintains the High state. As a result, the operational amplifier A1 outputs the reference voltage while offset cancellation is performed by the capacitive element C11. Further, the capacitive element C12 samples the reference voltage.

Next, at time t13, the second switch SW12 enters the Low state, and the third switch SW13 enters the Low state. Note that the first switch SW11 maintains the Low state. As a result, the reference voltage sampled by the capacitive element C12 is output to the DAC 1343 of the column ADC 134A via the transistor Tr1.

Note that the reference voltage generation circuit 152B is similar to the case of the first embodiment illustrated in FIG. 12 in that sampling and cancellation of the offset voltage are performed with a period during which the solid-state imaging device 100 reads out the pixels 111 of one row as one cycle.

As described above, since the reference voltage generation circuit 152B includes the sample hold circuit, the output of the operational amplifier A1 can be held, a steady current of the operational amplifier A1 can be reduced, and power consumption of the solid-state imaging device 100 can be reduced.

4. Third Embodiment

Figure 17:
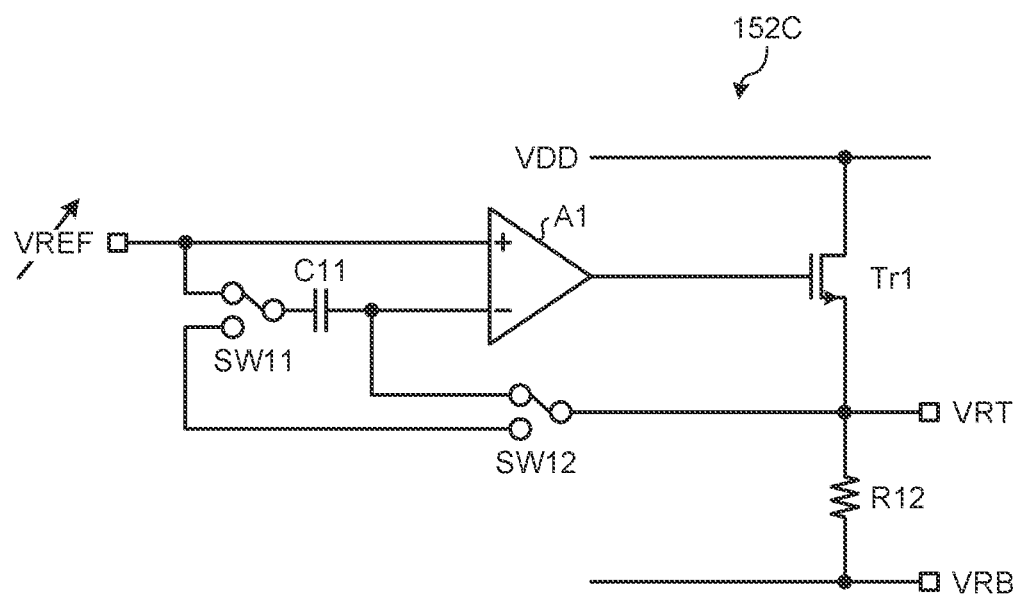
FIG. 17 is a diagram illustrating a configuration example of a reference voltage generation circuit according to a third embodiment of the present disclosure.

Next, a reference voltage generation circuit 152C according to a third embodiment of the present disclosure will be described. FIG. 17 is a diagram illustrating a configuration example of a reference voltage generation circuit 152C according to the third embodiment of the present disclosure. The reference voltage generation circuit 152C according to the present embodiment has the same configuration and operation as those of the reference voltage generation circuit 152A according to the first embodiment except that a resistor R12 having a fixed resistance value is provided instead of the variable resistance circuit R11 illustrated in FIG. 8.

Note that, by changing the variable resistance circuit R11 to the resistor R12, the amplification factor of the operational amplifier A1 cannot be adjusted. Therefore, in the present embodiment, by making the reference voltage VREF input to the reference voltage generation circuit 152C variable, the value of the reference voltage VRT output from the reference voltage generation circuit 152C is changed. As a result, even in a case where the resistor R12 having a fixed resistance value is provided instead of the variable resistance circuit R11, the reference voltage generation circuit 152C can generate a plurality of reference voltages VRT having different values.

5. Fourth Embodiment

Figure 18:
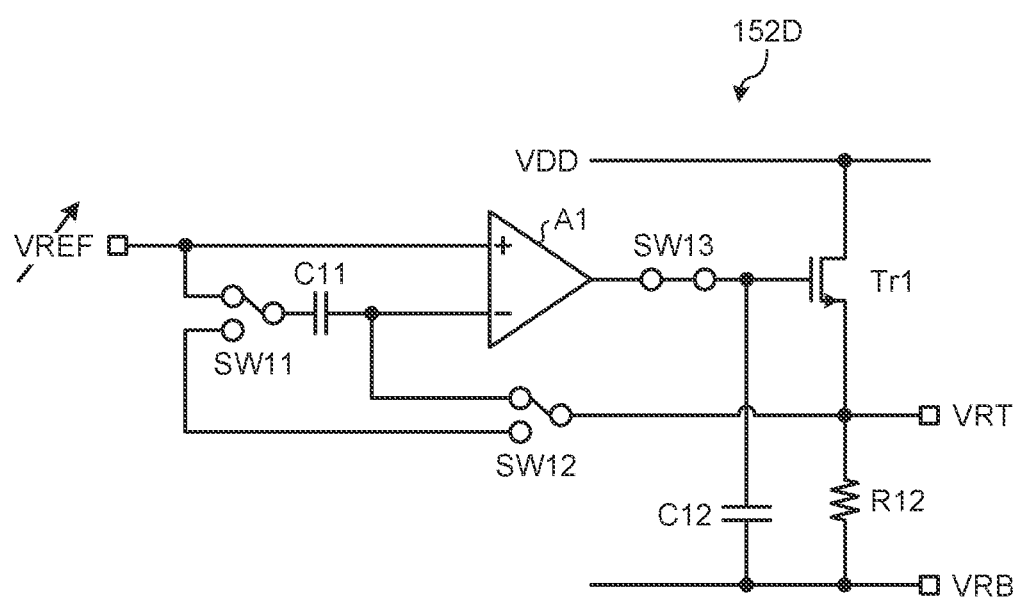
FIG. 18 is a diagram illustrating a configuration example of a reference voltage generation circuit according to a fourth embodiment of the present disclosure.

Next, a reference voltage generation circuit 152D according to a fourth embodiment of the present disclosure will be described. FIG. 18 is a diagram illustrating a configuration example of the reference voltage generation circuit 152D according to the fourth embodiment of the present disclosure. The reference voltage generation circuit 152D according to the present embodiment includes a sample hold circuit that holds the out of the operational amplifier A1 in addition to the configuration of the reference voltage generation circuit 152C illustrated in FIG. 14.

Note that the configuration of the sample hold circuit is the same as the sample hold circuit of the reference voltage generation circuit 152B according to the second embodiment illustrated in FIG. 15.

Even in a case where the resistor R12 having a fixed value is provided instead of the variable resistance circuit R11, the reference voltage generation circuit 152D can reduce a steady current of the operational amplifier A1 by providing the sample hold circuit.

6. Fifth Embodiment

Figure 19:
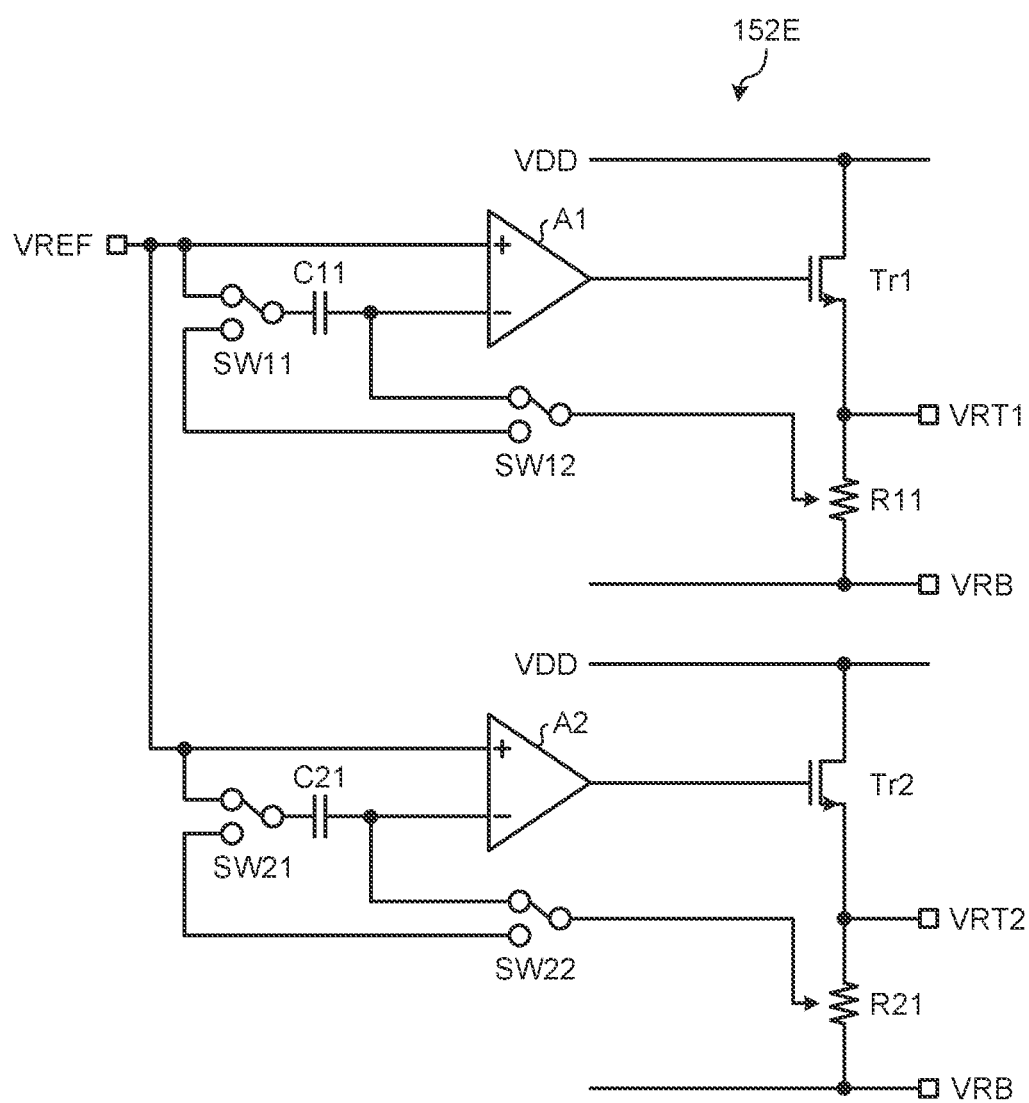
FIG. 19 is a diagram illustrating a configuration example of a reference voltage generation circuit according to a fifth embodiment of the present disclosure.

Next, a reference voltage generation circuit 152E according to a fifth embodiment of the present disclosure will be described. FIG. 19 is a diagram illustrating a configuration example of the reference voltage generation circuit 152E according to the fifth embodiment of the present disclosure. The reference voltage generation circuit 152E according to the present embodiment further includes a circuit for outputting a reference voltage VRT2 in addition to the configuration of the reference voltage generation circuit 152A illustrated in FIG. 8.

As illustrated in FIG. 19, the reference voltage generation circuit 152E includes an operational amplifier A2, a capacitive element C21, first and second switches SW21 and SW22, a transistor Tr2, and a variable resistance circuit R21, in addition to the configuration of the reference voltage generation circuit 152 illustrated in FIG. 8.

Note that the configuration and operation of the operational amplifier A2, the capacitive element C21, the first and second switches SW21 and SW22, the transistor Tr2, and the variable resistance circuit R21 are the same as the configuration and operation of the reference voltage generation circuit 152A illustrated in FIG. 8.

As illustrated in FIG. 19, when the reference voltages VRT1 and VRT2 are generated using the operational amplifiers A1 and A2, respectively, the offset voltages of the operational amplifiers A1 and A2 are different from each other, so that a voltage difference occurs between the reference voltages VRT1 and VRT2.

In the reference voltage generation circuit 152E according to the present embodiment, the offset voltage generated in the operational amplifier A1 is canceled using the capacitive element C11, and the offset voltage generated in the operational amplifier A2 is canceled using the capacitive element C21. As described above, by canceling the offset voltages of the operational amplifiers A1 and A2, the voltage difference between the reference voltages VRT1 and VRT2 can be further reduced.

7. Sixth Embodiment

Figure 20:
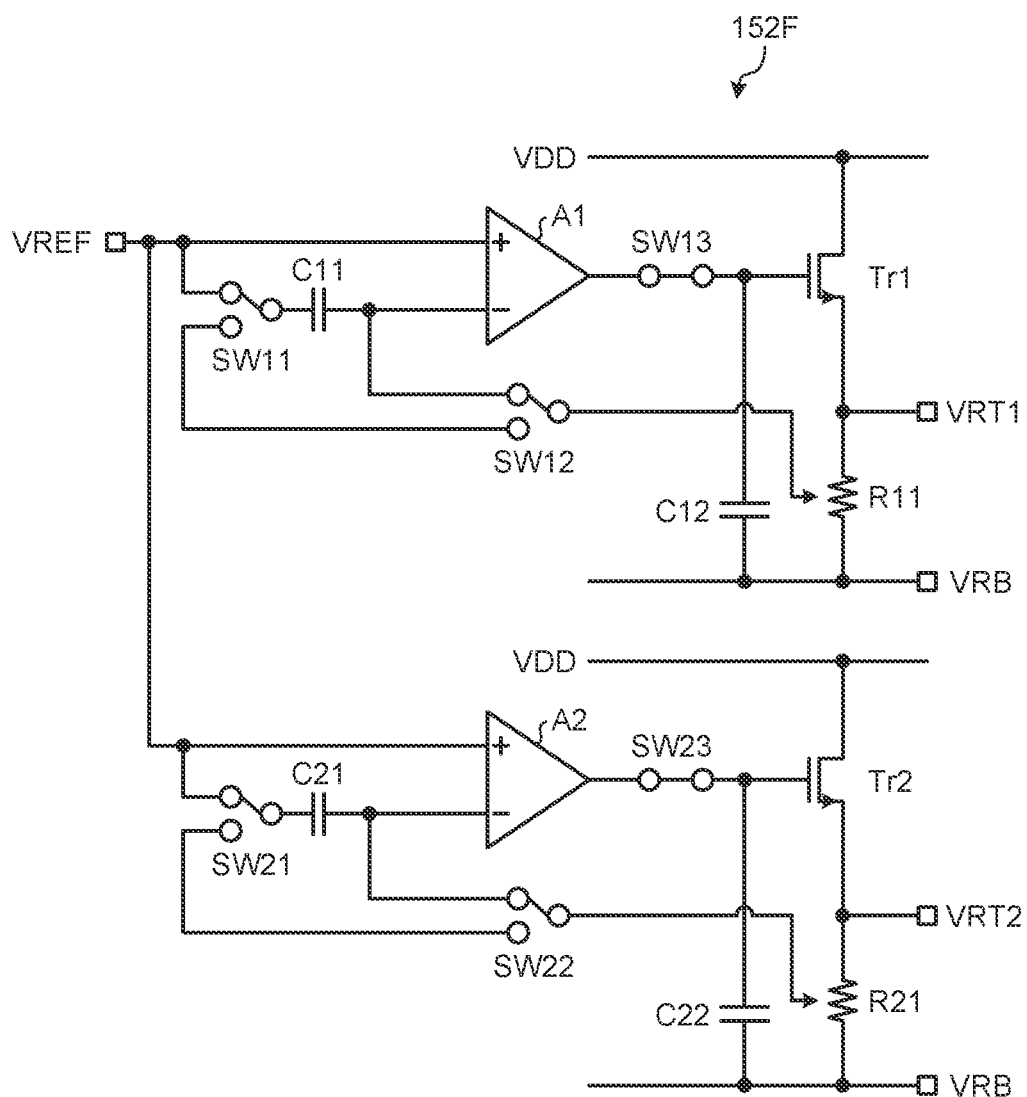
FIG. 20 is a diagram illustrating a configuration example of a reference voltage generation circuit according to a sixth embodiment of the present disclosure.

Next, a sixth embodiment of the present disclosure will be described. FIG. 20 is a diagram illustrating a configuration example of a reference voltage generation circuit 152F according to a sixth embodiment of the present disclosure. The reference voltage generation circuit 152F according to the sixth embodiment of the present disclosure includes sample hold circuits that hold outputs of the operational amplifiers A1 and A2, respectively, in addition to the configuration of the reference voltage generation circuit 152E illustrated in FIG. 19.

The sample hold circuit that holds the output of the operational amplifier A1 has the same configuration and operation as the sample hold circuit of the reference voltage generation circuit 152B illustrated in FIG. 15. Furthermore, the sample hold circuit that holds the output of the operational amplifier A2 includes a third switch SW23 and a capacitive element C22, and the configuration and operation thereof are the same as those of the sample hold circuit of the reference voltage generation circuit 152B illustrated in FIG. 15.

As described above, even in a case where the reference voltage generation circuit 152F outputs the two reference voltages VRT1 and VRT2, a steady current of the operational amplifiers A1 and A2 can be reduced by providing the sample and hold circuits.

8. Seventh Embodiment

Figure 21:
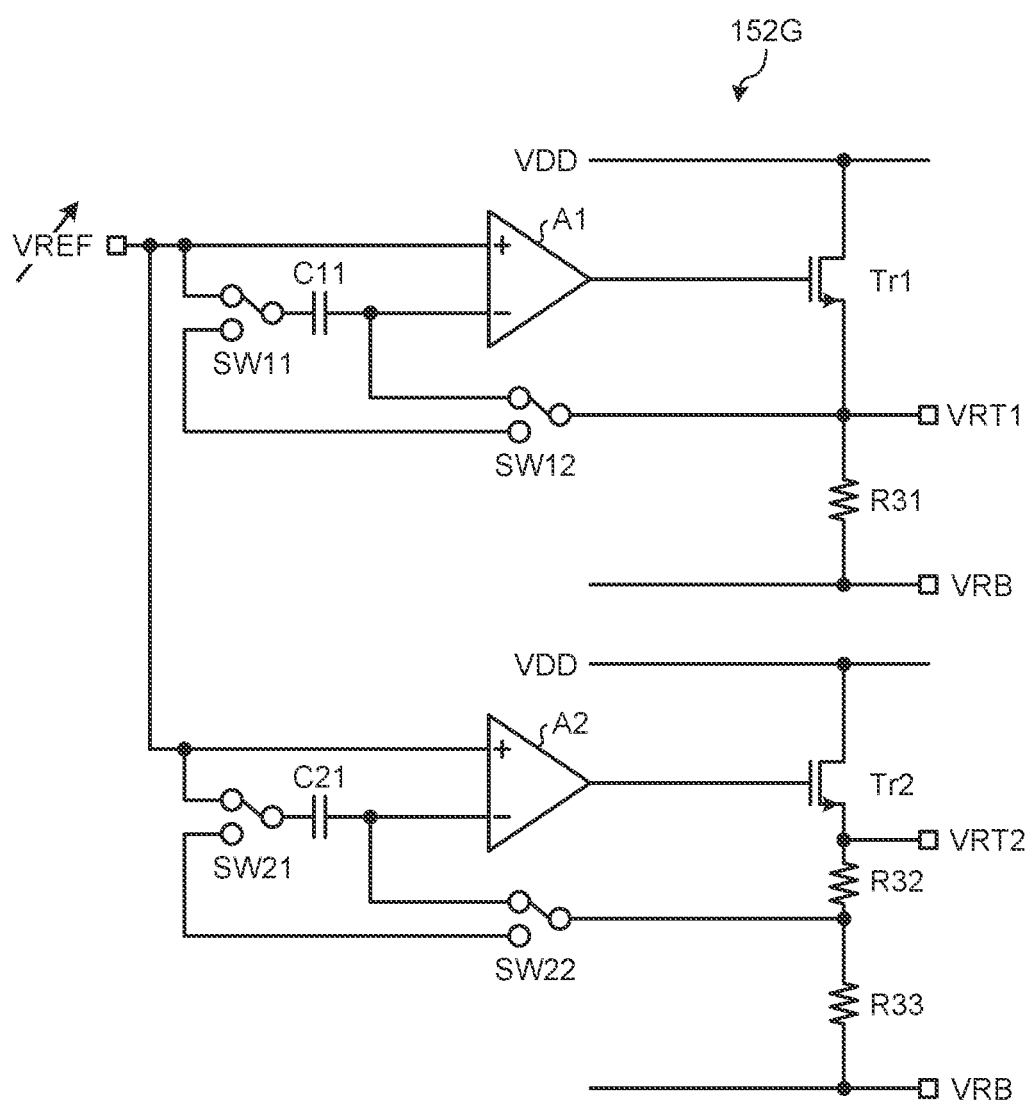
FIG. 21 is a diagram illustrating a configuration example of a reference voltage generation circuit according to a seventh embodiment of the present disclosure.

Next, a reference voltage generation circuit 152G according to a seventh embodiment of the present disclosure will be described. FIG. 21 is a diagram illustrating a configuration example of the reference voltage generation circuit 152G according to the seventh embodiment of the present disclosure. The reference voltage generation circuit 152G according to the present embodiment has the same configuration and operation as those of the reference voltage generation circuit 152E according to the fifth embodiment except that resistors R31 to R33 having fixed resistance values are provided instead of the variable resistance circuits R11 and R11 illustrated in FIG. 18.

The resistor R31 has one end connected to an output terminal of the reference voltage VRT1, and the other end connected to the reference potential VRB. The resistor 532 and the resistor 533 are connected in series. One end of the resistor 532 is connected to an output terminal of the reference voltage VRT2, and the other end of the resistor R33 is connected to the reference potential VRB. Furthermore, a connection point between the resistor R32 and the resistor R33 is connected to the second switch SW22. The resistor R32 is a part of a feedback loop of the operational amplifier A2. As a result, a voltage according to a voltage division ratio of a resistance circuit including the resistors R32 and R33 is applied to the feedback loop of the operational amplifier A2. The operational amplifier A2 amplifies the voltage VREF, which is an input, at an amplification factor according to a resistance ratio between the resistor R32 and the resistor R33 to generate the reference voltage VRT2.

For example, when the resistance ratio between the resistor R32 and the resistor R33 is 1:3, the operational amplifier A2 generates the reference voltage VRT2=4VREF obtained by multiplying the voltage VREF by 4. On the other hand, the operational amplifier A1 amplifies the voltage VREF with an amplification factor of 1 to generate the reference voltage VRT1. In other words, the operational amplifier A1 buffers the voltage VREF to generate the reference voltage VRT1=VREF. Therefore, in this case, the reference voltage generation circuit 152G can generate the reference voltages VRT1 and VRT2 of 1:4.

In this manner, by providing the resistors R31 to R33 having fixed resistance values, it is possible to generate reference voltages having a predetermined voltage ratio.

9. Eighth Embodiment

Figure 22:
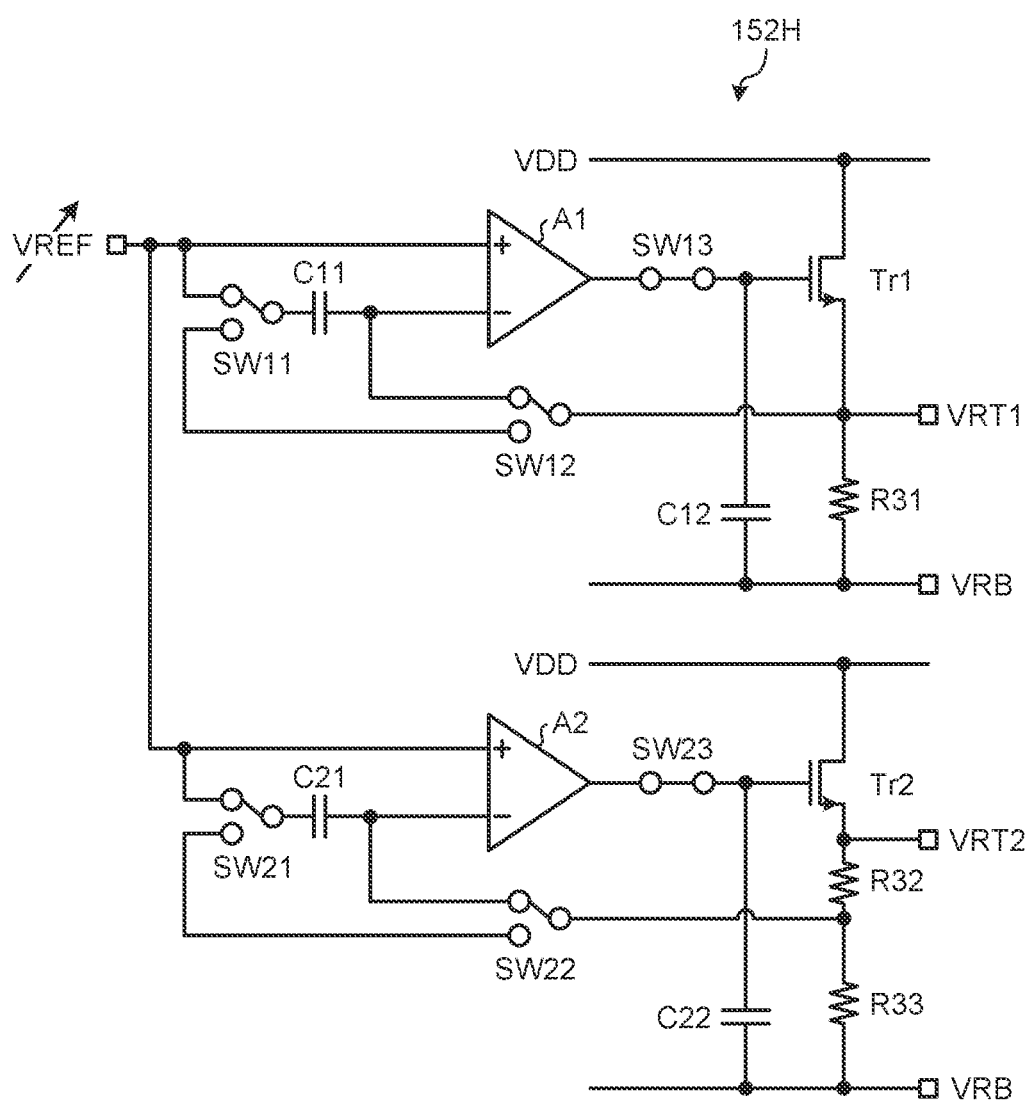
FIG. 22 is a diagram illustrating a configuration example of a reference voltage generation circuit according to an eighth embodiment of the present disclosure.

Next, a reference voltage generation circuit 152H according to an eighth embodiment of the present disclosure will be described. FIG. 22 is a diagram illustrating a configuration example of the reference voltage generation circuit 152H according to the eighth embodiment of the present disclosure. The reference voltage generation circuit 152H according to the present embodiment includes sample hold circuits that hold the out of the operational amplifiers A1 and A2, respectively, in addition to the configuration of the reference voltage generation circuit 152G illustrated in FIG. 21.

The configuration of the sample hold circuits that hold the outputs of the operational amplifiers A1 and A2 is the same as those of the reference voltage generation circuit 152F illustrated in FIG. 20. As described above, even in a case where the reference voltage generation circuit 152H outputs the two reference voltages VRT1 and VRT2, a steady current of the operational amplifiers A1 and A2 can be reduced by providing the sample hold circuits.

Figure 23:
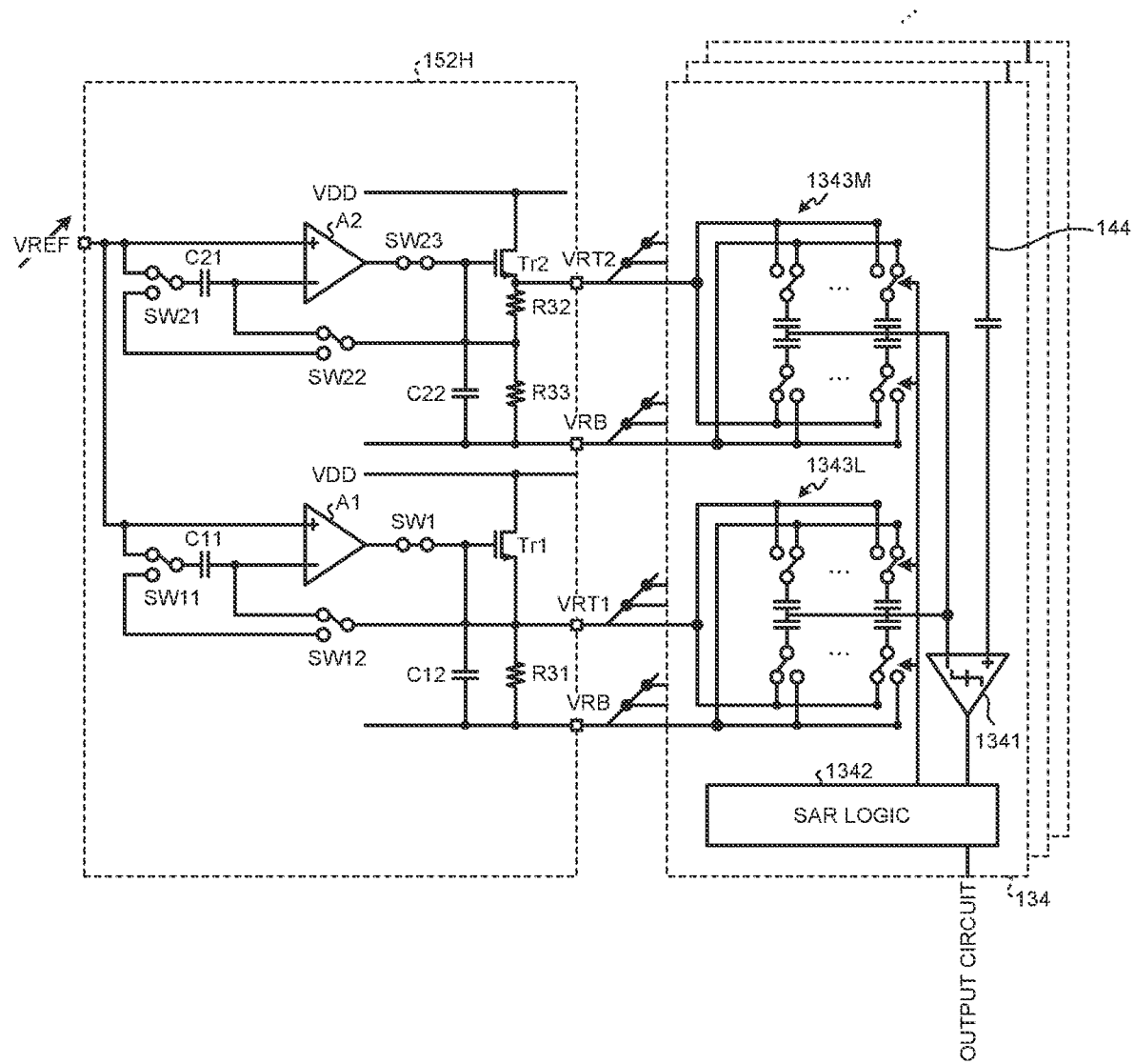
FIG. 23 is a diagram illustrating a configuration example of the reference voltage generation circuit and a column ADS according to the eighth embodiment of the present disclosure.

FIG. 23 is a diagram illustrating a configuration example of the reference voltage generation circuit 152H and the column ADC 134A according to the eighth embodiment of the present disclosure.

As illustrated in FIG. 23, the column ADC 134A is provided for each vertical signal line 144, and converts an analog pixel signal into a digital signal. As described above, the column ADC 134A includes the comparator 1341, the SAR logic circuit 1342, and the DAC 1343.

The DAC 1343 illustrated in FIG. 23 is different from the DAC 1343 illustrated in FIG. 4 in that a switch group switches between the reference voltage VRT1 and the reference potential VRB or switches between the reference voltage VRT2 and the reference potential VRB. However, the DAC 1343 illustrated in FIG. 23 is the same as the DAC 1343 illustrated in FIG. 4 in that a reference signal is generated on the basis of reference voltages having different voltage values.

The reference voltage generation circuit 152H generates the reference voltages VRT1 and VRT2, and out the reference voltages VRT1 and VRT2 to each of the plurality of ADCs 134A.

As described above, the reference voltage generation circuit 152H outputs the reference voltages VRT1 and VRT2 from which the offset voltage has been removed to each of the plurality of ADCs 134A, whereby the plurality of ADCs 134A can maintain the linearity of the output signal of the AD conversion. In addition, since the reference voltage generation circuit 152H outputs the plurality of different reference voltages VRT1 and VRT2, the total capacitance value of the DAC 1433 can be reduced, and the area of the DAC 1313 can be reduced. Since the DAC 1343 is provided for each vertical signal line 144, the area of the solid-state imaging device 100 can be further reduced by reducing the area of the DAC 1343.

10. Ninth Embodiment

Figure 24:
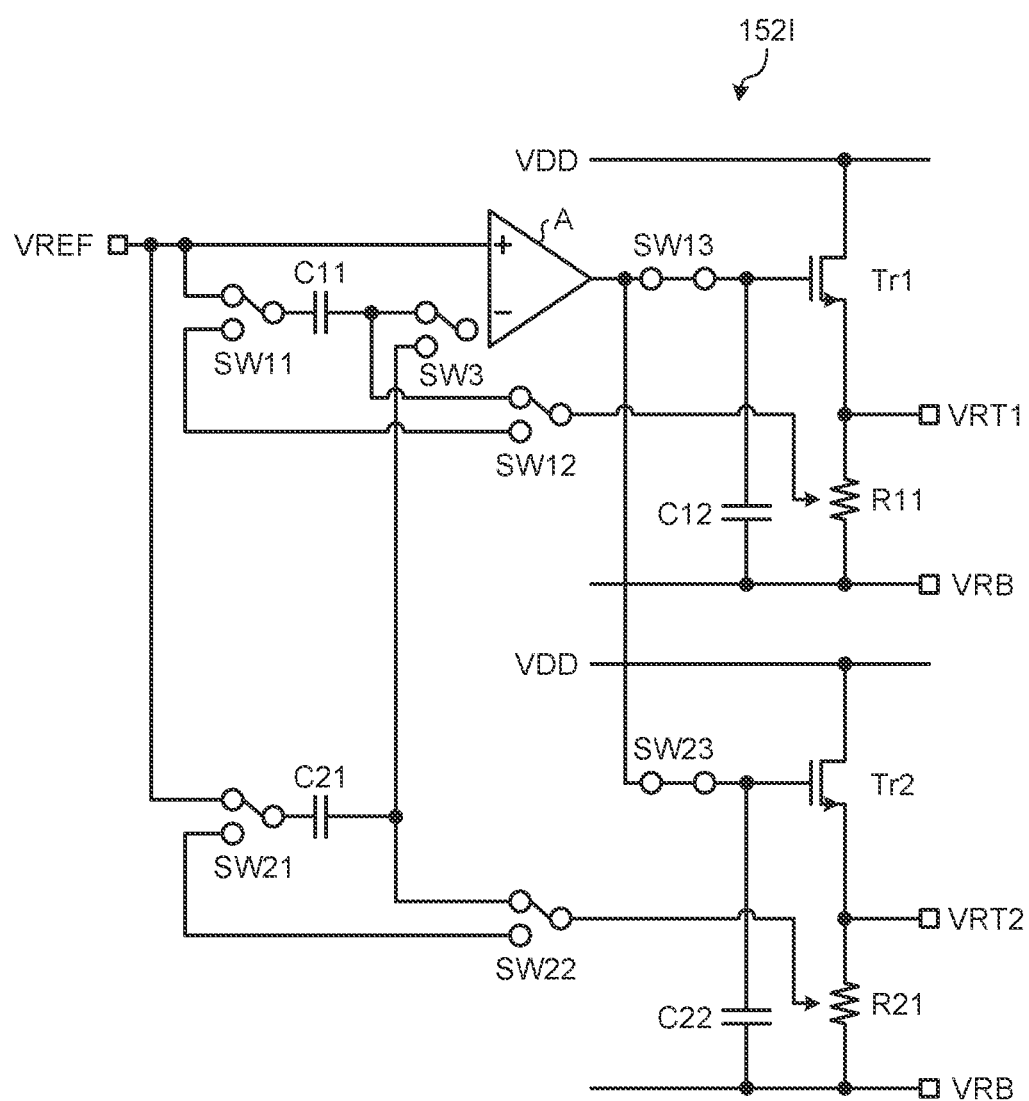
FIG. 24 is a diagram illustrating a configuration example of a reference voltage generation circuit according to a ninth embodiment of the present disclosure.

Next, a reference voltage generation circuit 152I according to a ninth embodiment of the present disclosure will be described. FIG. 24 is a diagram illustrating a configuration example of the reference voltage generation circuit 152I according to the ninth embodiment of the present disclosure. The reference voltage generation circuit 152I according to the present embodiment has the same components as those of the reference voltage generation circuit 152F illustrated in FIG. 20 except that the operational amplifier A2 is not provided and a switch SW3 is newly provided.

As illustrated in FIG. 24, one end of the capacitive element C11 of the reference voltage generation circuit 152I is connected to the operational amplifier A1 via the switch SW3. Similarly, one end of the capacitive element C21 is also connected to the operational amplifier A1 via the switch SW3. Furthermore, one end of the third switch SW23 is connected to the operational amplifier A1. As described above, the switch SW3 switches the capacitive element connected to the operational amplifier A1 to either the capacitive element C11 or the capacitive element C21.

The switch SW3 is a switching circuit that switches whether the operational amplifier A1 generates the reference voltage VRT1 or the reference voltage VRT2. That is, the reference voltage generation circuit 152I according to the present embodiment time-divides and generates the reference voltages VRT1 and VRT2 by switching the switch SW3. The reference voltage generation circuit 152I outputs the reference voltages VRT1 and VRT2 generated by time division to the DAC 1343 in a subsequent stage by holding the generated reference voltages VRT1 and VRT2 in the sample hold circuits.

The switch SW3 performs switching such that, for example, a feedback loop including the transistor Tr1 is connected to the operational amplifier A1 in the High state, and a feedback loop including the transistor Tr2 is connected to the operational amplifier A1 in the Low state. That is, the switch SW3 performs switching such that, for example, the reference voltage generation circuit 152I generates the reference voltage VRT1 in the High state, and the reference voltage VRT2 is generated in the Low state.

Figure 25:
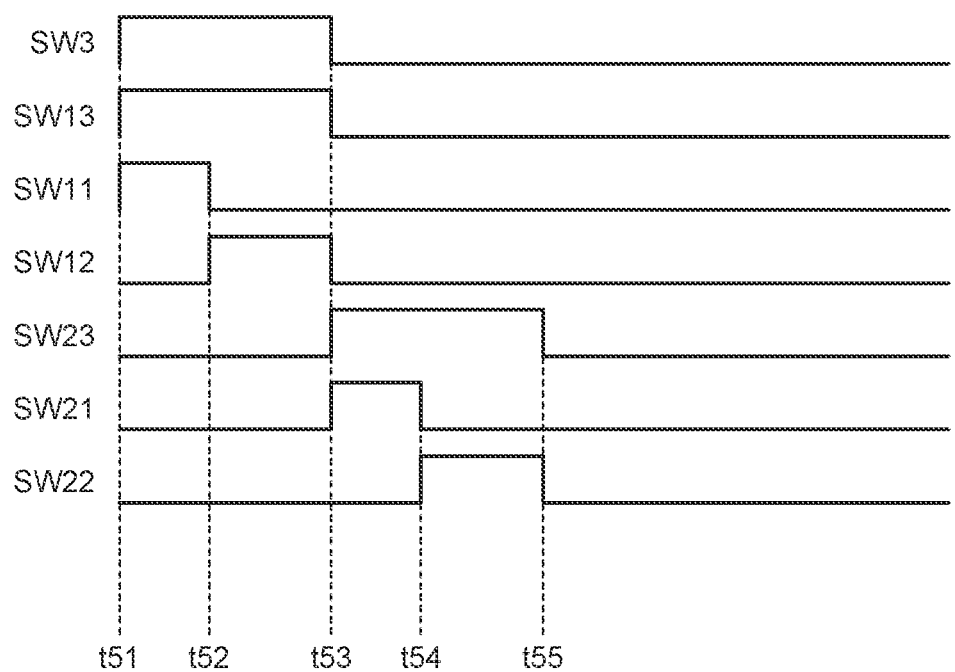
FIG. 25 is a diagram for explaining an operation example of the reference voltage generation circuit according to the ninth embodiment of the present disclosure.

FIG. 25 is a diagram for explaining an operation of the reference voltage generation circuit 152I according to the ninth embodiment of the present disclosure.

As illustrated in FIG. 25, at time t51, the switch SW3, the third switch SW13, and the first switch SW11 go into a High state, and the second switches SW12 and SW22, the third switch SW23, and the first switch SW21 go into a Low state. As a result, one end of the capacitive element C11 is connected to the output terminal of the voltage generation circuit 151, and the other end is connected to the feedback loop. Then, the capacitive element C11 samples the offset voltage of the operational amplifier A1.

Subsequently, at time t52, the first switch S11 enters the Low state, and the second switch SW12 enters the High state. The other switches maintain the state at time t51. As a result, the other end of the capacitive element C11 is connected to the feedback loop, and charges accumulated by the capacitive element C11 until the time t52 are applied to the feedback loop of the operational amplifier A1 with an opposite polarity.

Therefore, in a state where the offset voltage of the operational amplifier A1 is canceled, the operational amplifier A1 generates the reference voltage VRT1 and holds the reference voltage VRT1 in the capacitive element C12 of the sample hold circuit.

Next, at time t53, the switch SW3, the third switch SW13, and the second switch SW12 go into the Low state. In addition, the third switch SW23 and the first switch SW21 go into the High state. The other switches maintain the state at time t52. As a result, one end of the capacitive element C21 is connected to the output terminal of the voltage generation circuit 151, and the other end is connected to the feedback loop. Then, the capacitive element C21 samples the offset voltage of the operational amplifier A1.

Subsequently, at time t54, the first switch S21 enters the Low state, and the second switch SW22 enters the High state. The other switches maintain the state at time t53. As a result, the other end of the capacitive element C21 is connected to the feedback loop, and charges accumulated by the capacitive element C21 until the time t54 are applied to the feedback loop of the operational amplifier A1 with an opposite polarity.

Therefore, in a state where the offset voltage of the operational amplifier A1 is canceled, the operational amplifier A1 generates the reference voltage VRT2 and holds the reference voltage VRT2 in the capacitive element C22 of the sample hold circuit.

Next, when the third switch SW23 and the second switch SW22 go into the Low state at time t55, the reference voltages VRT1 and VRT2 held in the capacitive elements C12 and C22 are output from the reference voltage generation circuit 152I.

The reference voltage generation circuit 152I executes the operation of FIG. 25 for each row in which the solid-state imaging device 100 reads out pixel signals. Note that, in FIG. 25, a case where the reference voltage generation circuit 152I generates the reference voltage VRT1 and then generates the reference voltage VRT2 has been described, but the order of generating the reference voltages VRT1 and VRT2 is not limited thereto, and the reference voltages may be generated first from the reference voltage VRT2.

As described above, even if there is one operational amplifier A1 of the reference voltage generation circuit 152I, the reference voltages VRT1 and VRT2 having different voltage values can be generated by time-dividing and using the operational amplifier A1. As a result, the number of operational amplifiers A1 can be reduced, and the area of the reference voltage generation circuit 152I can be reduced.

11. Application Example

The technique according to the present disclosure can also be applied to an indirect time of flight (TOF) distance image sensor in addition to the imaging element such as the CMOS image sensor described above. The indirect TOF distance image sensor is a sensor that measures a distance to an object by reflecting light emitted from a light source by the object, and measuring light flight time based on detection of an arrival phase difference of the reflected light.

11.1. System Configuration Example

Figure 26:
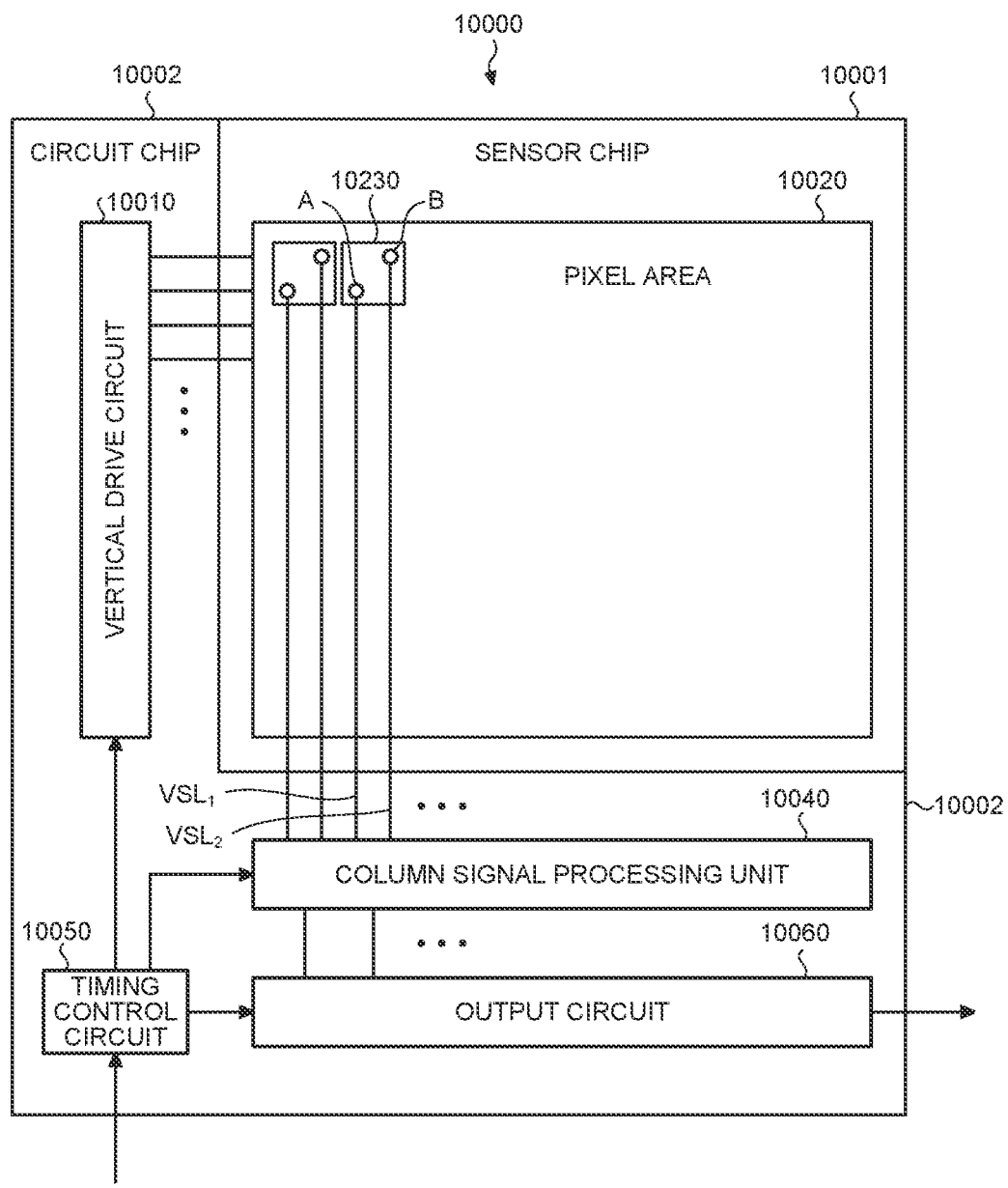
FIG. 26 is a block diagram illustrating an example of a system configuration of an indirect TOF distance image sensor to which the technique according to the present disclosure is applied.

FIG. 26 is a block diagram illustrating an example of a system configuration of an indirect TOF distance image sensor to which the technique according to the present disclosure is applied.

As illustrated in FIG. 26, an indirect TOF distance image sensor 10000 has a stacked structure including a sensor chip 10001, and a circuit chip 10002 stacked on the sensor chip 10001. In this stacked structure, the sensor chip 10001 and the circuit chip 10002 are electrically connected through a connection portion (not illustrated) such as a via (VIA) or a Cu—Cu connection. Note that FIG. 26 illustrates a state in which the wiring of the sensor chip 10001 and the wiring of the circuit chip 10002 are electrically connected via the above-described connection portion.

A pixel array unit 10020 is formed on the sensor chip 10001. The pixel array unit 10020 includes a plurality of pixels 10230 arranged in a matrix (array) in a two-dimensional grid pattern on the sensor chip 10001. In the pixel array unit 10020, each of the plurality of pixels 10230 receives infrared light, performs photoelectric conversion, and outputs an analog pixel signal. In the pixel array unit 10020, two vertical signal lines $VSL_1$ and $VSL_2$ are wired for each pixel column. Assuming that the number of pixel columns of the pixel array unit 10020 is M (M is an integer), a total of 2×M vertical signal lines VSL are wired in the pixel array unit 10020.

Each of the plurality of pixels 10230 has two taps A and B (details thereof will be described later). Among the two vertical signal lines $VSL_1$ and $VSL_2$, a pixel signal $AIN_{P1}$ based on a charge of the tap A of the pixel 10230 in the corresponding pixel column is output to the vertical signal line $VSL_1$, and a pixel signal $AIN_{P2}$ based on a charge of the tap B of the pixel 10230 in the corresponding pixel column is output to the vertical signal line VSL2. The pixel signals $AIN_{P1}$ and $AIN_{P2}$ will be described later.

On the circuit chip 10002, a vertical drive circuit 10010, a column signal processing unit 10040, an output circuit 10060, and a timing control unit 10050 are arranged. The vertical drive circuit 10010 drives each pixel 10230 of the pixel array unit 10020 in units of pixel rows, and outputs the pixel signals $AIN_{P1}$ and $AIN_{P2}$. Under the driving by the vertical drive circuit 10010, the pixel signals $AIN_{P1}$ and $AIN_{P2}$ output from the pixels 10230 in a selected row are supplied to the column signal processing unit 10040 through the vertical signal lines $VSL_1$ and $VSL_2$.

The column signal processing unit 10040 includes, for example, a plurality of ADCs (corresponding to the above-described column ADC 134A) provided for each pixel column corresponding to the pixel column of the pixel array unit 10020. Each ADC performs AD conversion processing on the pixel signals $AIN_{P1}$ and $AIN_{P2}$ supplied through the vertical signal lines $VSL_1$ and $VSL_2$, and outputs the pixel signals $AIN_{P1}$ and $AIN_{P2}$ to the output circuit 10060. The output circuit 10060 performs CDS processing or the like on the digitized pixel signals $AIN_{P1}$ and $AIN_{P2}$ output from the column signal processing unit 10040, and outputs the pixel signals $AIN_{P1}$ and $AIN_{P2}$ to the outside of the circuit chip 10002.

The timing control unit 10050 generates various timing signals, clock signals, control signals, and the like, and performs drive control of the vertical drive circuit 10010, the column signal processing unit 10040, the output circuit 10060, and the like on the basis of these signals.

11.2. Circuit Configuration Example of Pixel

Figure 27:
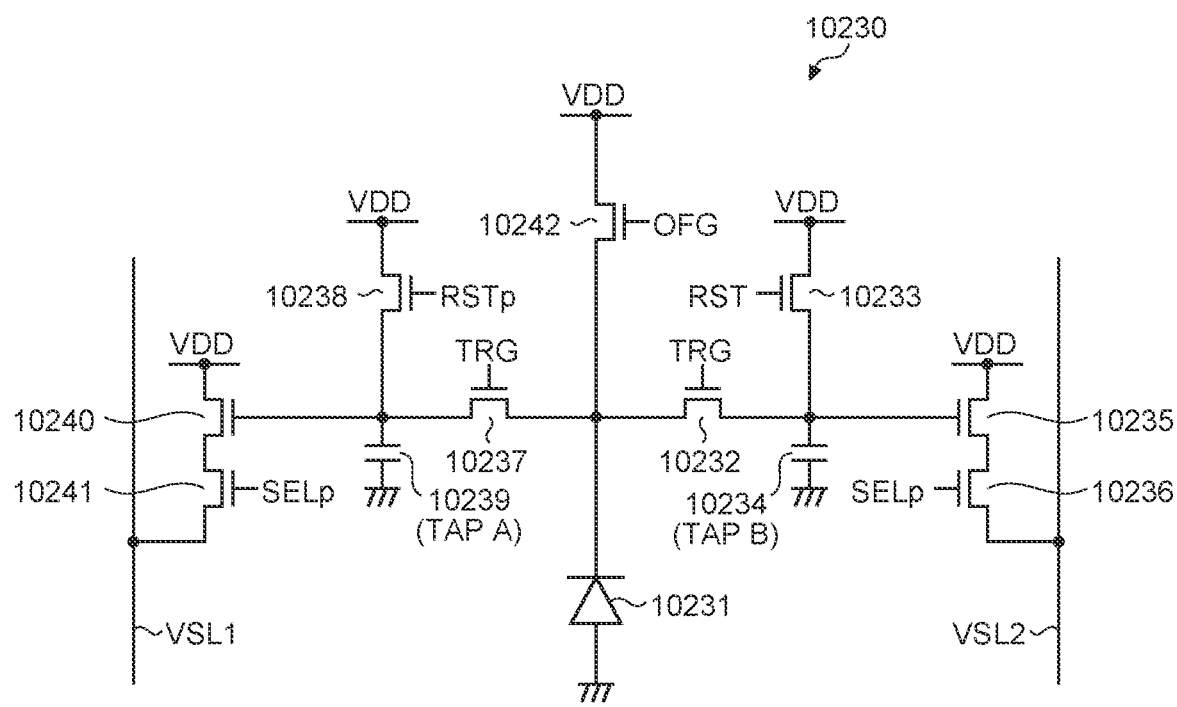
FIG. 27 is a circuit diagram illustrating an example of a circuit configuration of a pixel in the indirect TOF distance image sensor to which the technique according to the present disclosure is applied.

FIG. 27 is a circuit diagram illustrating an example of a circuit configuration of a pixel in an indirect TOF distance image sensor to which the technique according to the present disclosure is applied.

The pixel 10230 according to the present example includes, for example, a photodiode 10231 as a photoelectric conversion unit. In addition to the photodiode 10231, the pixel 10230 includes an overflow transistor 10242, two transfer transistors 10232 and 10237, two reset transistors 10233 and 10238, two floating diffusion layers 10234 and 10239, two amplification transistors 10235 and 10240, and two selection transistors 10236 and 10241. The two floating diffusion layers 10234 and 10239 correspond to the taps A and B illustrated in FIG. 26.

The photodiode 10231 photoelectrically converts received light to generate a charge. The photodiode 10231 can have a back-illuminated pixel structure. The back-illuminated structure is as described in the pixel structure of the CMOS image sensor. However, the structure is not limited to the back-illuminated structure, and may be a front surface irradiation type structure that takes in light emitted from a substrate front surface side.

The overflow transistor 10242 is connected between a cathode electrode of the photodiode 10231 and a power supply line of a power supply voltage VDD, and has a function of resetting the photodiode 10231. Specifically, the overflow transistor 10242 becomes conductive in response to an overflow gate signal OFG supplied from the vertical drive circuit 10010, thereby sequentially discharging the charges of the photodiode 10231 to the power supply line.

The two transfer transistors 10232 and 10237 are connected between the cathode electrode of the photodiode 10231 and each of the two floating diffusion layers 10234 and 10239. Then, the transfer transistors 10232 and 10237 become conductive in response to a transfer signal TRG supplied from the vertical drive circuit 10010, thereby sequentially transferring the charges generated in the photodiode 10231 to the floating diffusion layers 10234 and 10239, respectively.

The floating diffusion layers 10234 and 10239 corresponding to the taps A and B accumulate the charges transferred from the photodiode 10231, convert the charges into voltage signals having voltage values corresponding to the charge amounts, and generate the pixel signals $AIN_{P1}$ and $AIN_{P2}$.

The two reset transistors 10233 and 10238 are connected between each of the two floating diffusion layers 10234 and 10239 and the power supply line of the power supply voltage VDD. Then, the reset transistors 10233 and 10238 become conductive in response to a reset signal RST supplied from the vertical drive circuit 10010, thereby extracting charges from each of the floating diffusion layers 10234 and 10239 and initializing the charge amount.

The two amplification transistors 10235 and 10240 are connected between the power supply line of the power supply voltage VDD and each of the two selection transistors 10236 and 10241, and amplify the voltage signals subjected to charge-voltage conversion in each of the floating diffusion layers 10234 and 10239.

The two selection transistors 10236 and 10241 are connected between the two amplification transistors 10235 and 10240 and the vertical signal lines $VSL_1$ and $VSL_2$, respectively. Then, the selection transistors 10236 and 10241 become conductive in response to a selection signal SEL supplied from the vertical drive circuit 10010, thereby outputting the voltage signals amplified by the amplification transistors 10235 and 10240 to the two vertical signal lines $VSL_1$ and $VSL_2$ as the pixel signals $AIN_{P1}$ and $AIN_{P2}$, respectively.

The two vertical signal lines $VSL_1$ and $VSL_2$ are connected to an input end of one ADC in the column signal processing unit 10040 for each pixel column, and transmit the pixel signals $AIN_{P1}$ and $AIN_{P2}$ output from the pixels 10230 to the ADC for each pixel column.

Note that the circuit configuration of the pixel 10230 is not limited to the circuit configuration illustrated in FIG. 27 as long as the pixel signals $AIN_{P1}$ and $AIN_{P2}$ can be generated by photoelectric conversion.

In the indirect TOF distance image sensor 10000 having the above configuration, the technique according to the present disclosure can be applied to the reference voltage generation circuit that generates the reference voltage input to each ADC provided in the column signal processing unit 10040. That is, the reference voltage generation circuits according to the first to ninth embodiments can be used as the reference voltage generation circuit that generates the reference voltage input to each ADC of the column signal processing unit 10040.

12. Supplement

Although the preferred embodiments of the present disclosure have been described in detail with reference to the accompanying drawings, the technical scope of the present disclosure is not limited t such examples. It is obvious that a person having ordinary knowledge in the technical field of the present disclosure can conceive various changes or modifications within the scope of the technical idea described in the claim, and it is naturally understood that these also belong to the technical scope of the present disclosure.

Furthermore, the advantageous effects described in the present specification are merely illustrative or exemplary, and are not restrictive. That is, the technique according to the present disclosure can exhibit other effects obvious to those skilled in the art from the description of the present specification together with or instead of the above advantageous effects.

Note that the present technique can also have the following configurations.

(1)

A solid-state imaging device comprising:
  a conversion circuit connected to a vertical signal line extending from a pixel array unit;
  a voltage generation circuit that outputs a predetermined voltage; and
  a reference voltage generation circuit that receives the predetermined voltage as an input and outputs a reference voltage of the conversion circuit,
  wherein the reference voltage generation circuit includes:
  an operational amplifier that amplifies the predetermined voltage at a predetermined magnification and outputs the reference voltage;
  a capacitive element having one end connected to an input end of the operational amplifier, the input end being different from an input end to which the predetermined voltage is input;
  a first switching circuit that switches a connection destination of the other end of the capacitive element to either an output end of the voltage generation circuit from which the predetermined voltage is output or a feedback loop of the operational amplifier; and
  a second switching circuit that switches whether or not the one end of the capacitive element is connected to the feedback loop of the operational amplifier.

(2)

The solid-state imaging device according to (1), wherein the reference voltage generation circuit further includes a sample hold circuit that holds an output of the operational amplifier.

(3)

The solid-state imaging device according to (1) or (2), wherein the reference voltage generation circuit further includes a resistance circuit constituting the feedback loop of the operational amplifier.

(4)

The solid-state imaging device according to any one of (1) to (3), wherein the resistance circuit is a variable resistance circuit.

(5)

The solid-state imaging device according to any one of (1) to (3), wherein the resistance circuit applies a voltage having a predetermined voltage division ratio to the feedback loop.

(6)

The solid-state imaging device according to any one of (1) to (5), wherein the reference voltage generation circuit further includes:
  a second operational amplifier that amplifies the predetermined voltage at a predetermined magnification and outputs the reference voltage;
  a second capacitive element having one end connected to an input end of the second operational amplifier, the input end being different from an input end to which the predetermined voltage is input;
  a third switching circuit that switches a connection destination of the other end of the second capacitive element to either an output end of the voltage generation circuit from which the predetermined voltage, is output or a feedback loop of the second operational amplifier; and
  a fourth switching circuit that switches whether or not the one end of the second capacitive element is connected to the feedback loop of the second operational amplifier.

(7)

The solid-state imaging device according to (6), wherein the reference voltage generation circuit further includes a second sample hold circuit that holds an output of the second operational amplifier.

(8)

The solid-state imaging device according to (1), wherein the reference voltage generation circuit further includes
  a second capacitive element having one end connected to an input end of the operational amplifier, the input end being different from an input end to which the Predetermined voltage is input;
  a third switching circuit that switches a connection destination of the other end of the second capacitive element to either an output end of the voltage generation circuit from which the predetermined voltage is output or a second feedback loop of the operational amplifier;
  a fourth switching circuit that switches whether or not the second feedback loop of the operational amplifier is connected to the one end of the second capacitive element;
  a sample hold circuit that is connected to the feedback loop of the operational amplifier and holds an output of the operational amplifier;
  a second sample hold circuit that is connected to the second feedback loop of the operational amplifier and holds an output of the operational amplifier; and a fifth switching circuit that switches whether or not one of the capacitive element and the second capacitive element is connected to the input end of the operational amplifier, (9) An electronic apparatus comprising:
a solid-state imaging device; and
a signal processing unit that processes a signal output from the solid-state imaging device,
wherein the solid-state imaging device includes:
a conversion circuit connected to a vertical signal line extending from a pixel array unit;
a voltage generation circuit that outputs a predetermined voltage; and
a reference voltage generation circuit that receives the predetermined voltage as an input and outputs a reference voltage of the conversion circuit, and
the reference voltage generation circuit includes:
an operational amplifier that amplifies the predetermined voltage at a predetermined magnification and outputs the reference voltage;
a capacitive element having one end connected to an input end of the operational amplifier, the input end being different from an input end to which the predetermined voltage is input;
a first switching circuit that switches a connection destination of the other end of the capacitive element to either an output end of the voltage generation circuit from which the predetermined voltage is output or a feedback loop of the operational amplifier; and
a second switching circuit that switches whether or not the one end of the capacitive element is connected to the feedback loop of the operational amplifier.

REFERENCE SIGNS LIST

1 ELECTRONIC APPARATUS
100 SOLID-STATE IMAGING DEVICE
111 IMAGING ELEMENT
142 PIXEL DRIVE WIRING
144 VERTICAL SIGNAL LINE
134 COLUMN SIGNAL PROCESSING CIRCUIT
134A AD CONVERTER
1341 COMPARATOR
1342 SAR LOGIC CIRCUIT
1343 DAC
151 VOLTAGE GENERATION CIRCUIT
152 REFERENCE VOLTAGE GENERATION CIRCUIT

The invention claimed is:

1. A solid-state imaging device comprising:
a conversion circuit connected to a vertical signal line extending from a pixel array unit;
a voltage generation circuit that outputs a predetermined voltage; and
a reference voltage generation circuit that receives the predetermined voltage as an input and outputs a reference voltage of the conversion circuit,
wherein the reference voltage generation circuit includes:
an operational amplifier that amplifies the predetermined voltage at a predetermined magnification and outputs the reference voltage;
a capacitive element having one end connected to an input end of the operational amplifier, the input end being different from an input end to which the predetermined voltage is input;
a first switching circuit that switches a connection destination of the other end of the capacitive element to either an output end of the voltage generation circuit from which the predetermined voltage is output or a feedback loop of the operational amplifier; and
a second switching circuit that switches whether or not the one end of the capacitive element is connected to the feedback loop of the operational amplifier.

2. The solid-state imaging device according to claim 1, wherein the reference voltage generation circuit further includes a sample hold circuit that holds an output of the operational amplifier.

3. The solid-state imaging device according to claim 1, wherein the reference voltage generation circuit further includes a resistance circuit constituting the feedback loop of the operational amplifier.

4. The solid-state imaging device according to claim 3, wherein the resistance circuit is a variable resistance circuit.

5. The solid-state imaging device according to claim 3, wherein the resistance circuit applies a voltage having a predetermined voltage division ratio to the feedback loop.

6. The solid-state imaging device according to claim 1, wherein the reference voltage generation circuit further includes:
a second operational amplifier that amplifies the predetermined voltage at a predetermined magnification and outputs the reference voltage;
a second capacitive element having one end connected to an input end of the second operational amplifier, the input end being different from an input end to which the predetermined voltage is input;
a third switching circuit that switches a connection destination of the other end of the second capacitive element to either an output end of the voltage generation circuit from which the predetermined voltage is output or a feedback loop of the second operational amplifier; and
a fourth switching circuit that switches whether or not the one end of the second capacitive element is connected to the feedback loop of the second operational amplifier.

7. The solid-state imaging device according to claim 6, wherein the reference voltage generation circuit further includes a second sample hold circuit that holds an output of the second operational amplifier.

8. The solid-state imaging device according to claim 1, wherein the reference voltage generation circuit further includes:
a second capacitive element having one end connected to an input end of the operational amplifier, the input end being different from an input end to which the predetermined voltage is input;
a third switching circuit that switches a connection destination of the other end of the second capacitive element to either an output end of the voltage generation circuit from which the predetermined voltage is output or a second feedback loop of the operational amplifier;
a fourth switching circuit that switches whether or not the second feedback loop of the operational amplifier is connected to the one end of the second capacitive element;
a sample hold circuit that is connected to the feedback loop of the operational amplifier and holds an output of the operational amplifier;
a second sample hold circuit that is connected to the second feedback loop of the operational amplifier and holds an output of the operational amplifier; and a fifth switching circuit that switches whether or not one of the capacitive element and the second capacitive element is connected to the input end of the operational amplifier.

9. An electronic apparatus comprising:
a solid-state imaging device; and
a signal processing unit that processes a signal output from the solid-state imaging device,
wherein the solid-state imaging device includes:
a conversion circuit connected to a vertical signal line extending from a pixel array unit;
a voltage generation circuit that outputs a predetermined voltage; and
a reference voltage generation circuit that receives the predetermined voltage as an input and outputs a reference voltage of the conversion circuit, and
the reference voltage generation circuit includes:
an operational amplifier that amplifies the predetermined voltage at a predetermined magnification and outputs the reference voltage;
a capacitive element having one end connected to an input end of the operational amplifier, the input end being different from an input end to which the predetermined voltage is input;
a first switching circuit that switches a connection destination of the other end of the capacitive element to either an output end of the voltage generation circuit from which the predetermined voltage is output or a feedback loop of the operational amplifier; and
a second switching circuit that switches whether or not the one end of the capacitive element is connected to the feedback loop of the operational amplifier.

* * * * *